United States Patent [19]

Weaver et al.

[11] Patent Number: 4,804,719

[45] Date of Patent: Feb. 14, 1989

[54] WATER-DISSIPATABLE POLYESTER AND POLYESTER-AMIDES CONTAINING COPOLYMERIZED COLORANTS

[75] Inventors: Max A. Weaver; L. Jane Adams, both of Kingsport, Tenn.

[73] Assignee: Eastman Kodak Company, Rochester, N.Y.

[21] Appl. No.: 153,299

[22] Filed: Feb. 5, 1988

[51] Int. Cl.$^4$ .............................................. C08G 63/12
[52] U.S. Cl. ...................... 525/420; 525/421; 525/434; 525/437; 528/290; 528/293; 528/294; 528/295
[58] Field of Search ............... 528/290, 293, 294, 295; 525/420, 421, 434, 437

[56] References Cited

U.S. PATENT DOCUMENTS

| | | | |
|---|---|---|---|
| 2,571,319 | 10/1951 | Waters et al. | 18/54 |
| 3,034,920 | 5/1962 | Waller et al. | 117/38 |
| 3,104,233 | 9/1963 | Altermatt et al. | 260/37 |
| 3,278,486 | 11/1966 | Meek et al. | 260/47 |
| 3,359,230 | 12/1967 | Bowman et al. | 260/40 |
| 3,372,138 | 3/1968 | Bowman et al. | 260/40 |
| 3,401,192 | 9/1968 | Kollonitsch et al. | 260/471 |
| 3,417,048 | 12/1968 | Cooper et al. | 260/40 |
| 3,424,708 | 1/1969 | Bowman et al. | 260/40 |
| 3,489,713 | 1/1970 | Bowman et al. | 260/40 |
| 3,546,008 | 12/1970 | Shields et al. | 117/138.8 |
| 3,734,874 | 5/1973 | Kibler et al. | 260/29.2 E |
| 3,779,993 | 12/1973 | Kibler et al. | 260/75 S |
| 3,828,010 | 8/1974 | Davis et al. | 260/75 N |
| 4,051,138 | 9/1977 | Wang et al. | 260/278 |
| 4,088,650 | 5/1978 | Pape | 260/282 |
| 4,116,923 | 9/1978 | Gattner et al. | 528/220 |
| 4,141,881 | 2/1979 | Babler | 260/40 P |
| 4,202,814 | 5/1980 | Lienhard et al. | 260/40 P |
| 4,231,918 | 11/1980 | Babler | 260/40 P |
| 4,233,196 | 11/1980 | Sublett | 260/29.2 N |
| 4,267,306 | 5/1981 | Davis et al. | 528/226 |
| 4,279,802 | 7/1981 | Laely et al. | 260/40 P |
| 4,292,232 | 9/1981 | Dazzi et al. | 260/40 P |
| 4,344,767 | 8/1982 | Umsonst et al. | 524/159 |
| 4,359,570 | 11/1982 | Davis et al. | 528/289 |
| 4,403,092 | 9/1983 | Davis et al. | 528/290 |
| 4,477,635 | 10/1984 | Mitra | 525/437 |
| 4,617,373 | 10/1986 | Pruett et al. | 528/288 |
| 4,617,374 | 10/1986 | Pruett et al. | 528/288 |

Primary Examiner—Maurice J. Welsh
Assistant Examiner—L. Henderson
Attorney, Agent, or Firm—Thomas R. Savitsky; William P. Heath, Jr.

[57] ABSTRACT

Water-dispersible polymeric material such as polyesters and poly(ester-amides) containing water-solubilizing sulfonate groups and having reacted onto or into the polymer backbone from about 0.01 to about 40 mol % based on the total of all reactant hydroxy, carboxy or amino equivalents, of colorant comprising one or more heat stable organic compounds initially having one or more condensable groups, the polymeric material comprising the reaction residues of organic monomers and said colorant compounds containing one or more reactive groups condensable under polymerization conditions. This material is useful, for example, for printing inks or other coatings which are desireably applied from an aqueous system.

15 Claims, No Drawings

WATER-DISSIPATABLE POLYESTER AND POLYESTER-AMIDES CONTAINING COPOLYMERIZED COLORANTS

This invention concerns certain water-dissipatable, water soluble, water dispersible, or water suspensible polymers, all hereinafter termed water-dispersible, containing colorants as an integral part of the polymer structures. The polymers which are thus colored are useful in adhesives, coating materials, films, packaging materials, and products which can be dissolved or otherwise dispersed in cold or hot water. Aqueous dispersions of the colored polymers have utility as inks, paints, and other coatings where it is advantageous to use aqueous as opposed to organic solvents.

The descriptions and manufacture of exemplary base polymer compositions useful herein are given in U.S. Pat. Nos. 3,734,874, 3,779,993, 3,828,010, 4,233,196, and 3,546,008, the disclosures of which are incorporated herein by reference. These base polymers are modified according to the present invention which is defined in its broad sense as water-dispersible polymeric material having linking groups comprising at least about 20 mole % carbonyloxy and up to about 80 mole % carbonylamido, said material containing water-solubilizing sulfonate groups and having reacted onto or into the polymer backbone from about 0.01 to about 40 mol % based on the total of all reactant hydroxy, carboxy or amino equivalents, of colorant comprising one or more heat stable organic compounds initially having at least one condensable group. The aforementioned equivalents encompass the various condensable derivatives thereof including carbalkoxy, carbaryloxy, N-alkylcarbamyloxy, acyloxy, chlorocarbonyl, carbamyloxy, N-(alkyl)$_2$carbamyloxy, alkylamino, N-phenylcarbamyloxy, cyclohexanoyloxy, and carbocyclohexyloxy.

In a highly preferred embodiment of the present invention, the polymeric material contains carbonyloxy linking groups in the linear molecular structure wherein up to 80% of said linking groups may be carbonylamido linking groups, the polymer having an inherent viscosity of from about 0.1 to about 1.0 measured to a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole percent) to hydroxy and amino equivalents (100 mole percent), the polymer comprising the reaction residues of the following reactants (a), (b), (c), (d), and (e) or the ester forming or esteramide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one cationic sulfonate group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —CH$_2$—OH groups of which (1) at least 10 mole percent, based on the total mole percent of hydroxy or hydroxy and amino equivalents, is a poly(ethylene glycol) having the structural formula:

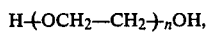

n being an integer of from 2 to about 20, or (2) of which from about 0.1 to less than about 15 mole percent, based on the total mole percent of hydroxy or hydroxy and amino equivalents, is a poly(ethylene glycol) having the structural formula:

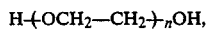

n being an integer of between 2 and about 500, and with the proviso that the mole percent of said poly(ethlene glycol) within said range is inversely proportional to the quantity of n with said range;

(d) from none to at least one difunctional reactant selected from a hydroxycarboxylic acid having one —(C(R)$_2$—OH group, an amino-carboxylic acid having one —NRH group, and an amino-alcohol having one —C(R)$_2$—OH group and one —NRH group, or mixtures of said difunctional reactants; wherein each R in the (c) or (d) reactants is a H atom or an alkyl group of 1 to 4 carbon atoms; and (e) from about 0.1 mole % to about 15 mole %, based on a total of all acid, hydroxyl and amino equivalents being equal to 200 mole % of colorant having at least one acid, hydroxy or amino group reacted onto or into the polymer chain.

In the above polymeric material it is preferred that very minor, e.g., less than about 10 mol % based on all reactants, of reactant (d) is employed, that at least about 70 mol % of reactant (c) is glycol, and that at least about 70 mol % of all hydroxy equivalents is present in the glycol.

Colorants capable of withstanding the conditions of polymerization and which in varying degrees are useful in the present invention are disclosed, for example, in U.S. Pat. Nos. 4,267,306; 4,359,570; 4,403,092; 4,617,373; 4,617,374; 3,278,486; 3,359,230; 3,401,192; 3,417,048; 3,424,708; 4,088,650; 4,116,923; 4,141,881; 4,477,635; 4,231,918; 3,104,233; 4,202,814; 4,279,802; 4,292,232; 4,344,767; 2,571,319; 3,034,920; 3,489,713; and 3,372,138, the disclosure of which are incorporated herein by reference. Particularly suitable of the above anthraquinone type colorants are those of U.S. Pat Nos. 4,359,570; 4,267,306; and 4,403,092. These colorants include the carboxy, hydroxy, ester, acid halides, and amino derivatives of such types of compounds as anthraquinones; methines; bis-methines, 3H-dibenz[f,ij]isoquinoline 2,7-diones (anthrapyridones); triphenodioxzines; fluorindines; phthaloylpyrrocolines; coumarins; phthaloylacridones; 4-amino-1,8-naphthalimides; thioxanthones; 2,5-arylaminoterephthalic acids (or esters); benzanthrones; 3,6-diaminopyromellitic acid dimides; quinophthalones; naphthalene 1:4:5:8-tetra carboxylic bis-imides; isothiazoloanthrones; anthrapyrimidines; anthrapyrimidones; and indanthrones. A variety of shades, e.g., from yellow to blue can be obtained by either mixing the colorants during polymerization, or by mixing the polymeric compositions containing individual colorants.

Preferred colorant types having excellent stability (good color yield and little, if any, shift in color) include the following: methines; anthraquinones; 3H-dibenz[f,ij]isoquinoline-2,7-diones (anthrapyridones); benzo[f]pyrido[1,2-a]indole-6,11-diones; thioxanthene-9-ones;

coumarins; 2H-1,4-benzoxazine-2-ones, triphenodioxazines, 5,12-dihydroquinoxalino[2,3-b]phenazine (fluorindines); 3,6-diaminopyromellitic acid diimides; 2,5(3)diarylaminoterephthalic acids (esters); 4-amino-1,8-naphthalimides; naphtho [1',2',3':4,5]quino[2,1-b]quinazoline-5,10-diones; 7H benzo[de]anthracen-7-ones (benzanthrones); 7H-benzo[e]perimidin-7-ones; 6,15-dihydro-5,9,14,18-anthrazinetetrones (indanthrones); quinophthalones; 7H-benzimidazo[2,1-a][de]isoquinolin-7-ones; 5H-benzo[a]phenoxazine-5-ones; 6H,13H-pyrido[1,2-a: 3,4-b]diindole-6,13-diones; and diindolo [3,2,1-de-3',2',1'-ij][1,5]naphthyridine-6,13-diones.

The anthrapyridones (isoquinoline derivatives or substituted 3H-dibenzo[f,ij]Isoquinoline-2,7-diones) of the general formula (I), for examples, shown below, show excellent thermal stability where R, $R_2$, $R_3$, $R_4$, Z and Z' are selected from hydrogen or, for example, a wide range of substituents including those shown in Table 18 below, giving colors including yellow, orange, red, and blue.

Exemplary anthrapyridones have the formula

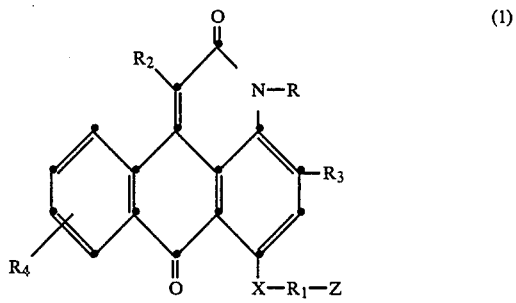

wherein: R is hydrogen, cycloalkyl or alkyl; X is —O—, —S—, or —NH—; —X—$R_1$—Z in combination is hydrogen or halogen; $R_1$ is selected from -alkylene-Z', -arylene-Z', -cycloalkylene-Z', -aralkylene-Z', -cycloalkylenealkylene-Z', -alkarylene-Z', -alkylenecycloalkylenealkylene-Z', -alkylenearalkylene-Z', or alkylenecycloalkylene-Z', wherein —Z and Z' are independently selected from hydrogen, —$SO_2R^5$, —$SO_2NR^5R^5$, —$NHSO_2R^5$, —$N(R^5)SO_2R^5$, —$N(R^5)COR^5$, —$NHCOR^5$, —OH, —$SR^5$, —$OR^5$, —$NHR^5$, —$NR^5R^5$, —$SO_2NHR^5$, —$CONHR^5$, —$CONR^5R^5$, —$CO_2R^5$, —$OCOR^5$, —O-$CO_2R^5$, —$OOCNHR^5$,

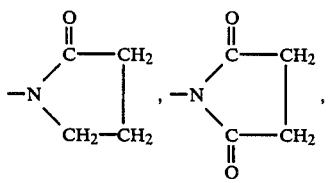

wherein $R^5$ is hydrogen, alkyl, allyl, aryl, cycloalkyl, hydroxyalkyl, alkoxyalkoxyalkyl, alkoxyalkyl, hydroxyalkoxy, hydroxyalkoxyalkoxy, alkoxycarbonylalkyl or carboxyaryl, and when X is —O—, or —NH—, —$R_1$—Z in combination also can be hydrogen, $R_2$ is hydrogen, alkyl, aryl, cyano, alkoxycarbonyl, aryloxycarbonyl, aralkoxycarbonyl, cycloalkylalkoxycarbonyl, COCl, carboxy, carbamyl, N-alkylcarbamyl, N,N-dialkylcarbamyl, N-alkyl-N-arylcarbamyl, N-arylcarbamyl, N-cycloalkylcarbamyl, acyl, aroyl, amino, alkylamino, dialkylamino, arylamino, cycloalkylamino, alkoxy, hydroxy, alkylthio or arylthio; each of $R_3$ and $R_4$ is hydrogen, alkyl, halogen or alkoxy; wherein each of the above alkyl, alkylene, aryl, arylene, cycloalkyl or cycloalkylene moieties or portions of a group or radical may be substituted where appropriate with 1-3 substituents selected from hydroxyl, acyloxy, alkyl, cyano, carboxy, alkoxycarbonyl, alkoxycarbonyloxy, halogen, alkoxy, hydroxyalkoxy, hydroxyalkyl, aryl, aryloxy, or cycloalkyl; and wherein, when the above hydroxyl substituent is absent or multicondensable groups are desired, at least one of R, $R_2$, $R_3$, or $R_4$ carries one or more condensable groups.

In particularly preferred embodiments of the invention: X is —NH— and —$R_1$—Z is combination is aryl, aryl substituted with 1-3 of alkyl, alkoxy, halogen, hydroxyalkyl, hydroxyalkoxy or acylamido, alkyl, or alkyl substituted with 1-3 of hydroxyl or acyloxy, cycloalkyl or cycloalkyl substituted with 1-3 of alkyl; —X—$R_1$—Z in combination is H; R is alkyl; $R_2$ is alkoxycarbonyl, hydroxyalkylamino, or cyano; and $R_3$ and $R_4$ are each hydrogen.

In all of the above definitions the alkyl or alkylene moieties or portions of the various groups contain from 1-8 carbons, straight or branched chain, the aryl or arylene nuclei contain from 4-10 carbons, and the cycloalkyl or cycloalkylene nuclei contain from 4-6 carbons. The suffix "ene," is used herein to designate a divalent radical or group, and the term "cycloalkyl" may be used interchangeably with "cycloaliphatic.".

The present colorant/polymer compositions give stable aqueous dispersions, showing no settling or sludging-out of the colorant. Since the colorants are copolymerized, they cannot be removed from the polymer by extraction or by contact with the body thus minimizing toxicological concerns as regards exposure to organic materials. The invention allows the preparation of aqueous solutions of colored polymer having high tinctorial value and good color stability to change in pH, temperature, concentration and the like.

Further preferred structure types given by exemplary formulae below generally exhibit very acceptable thermal stability. These basic structures are modified as necessary by incorporation of known reactive groups such as —COOH, —OH, ester, or the like. In these formulae, each available position on each ring may be unsubstituted or substituted with an R substituent as defined above.

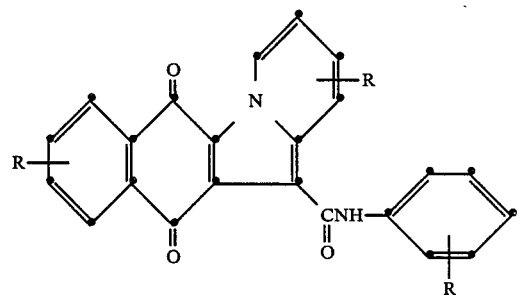

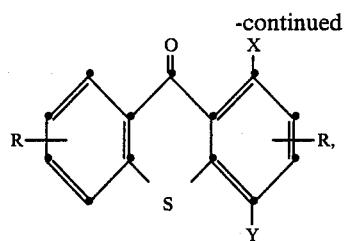
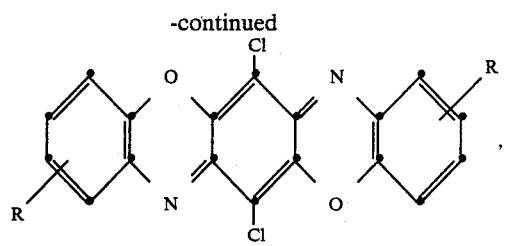
wherein X is, for example, —NHC₆H₅, and Y is —NO₂ or NHCOCH₃,
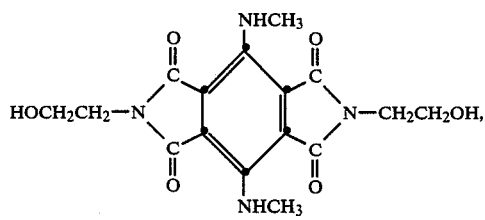
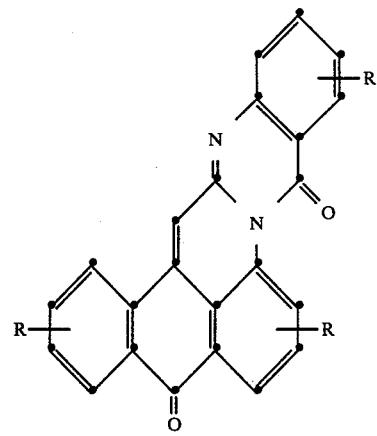
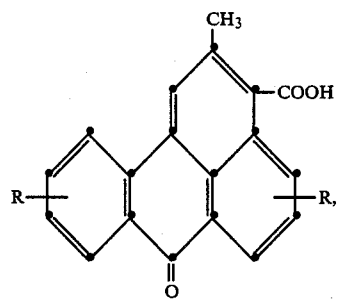
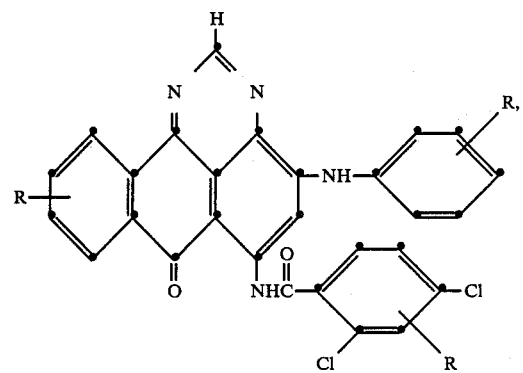
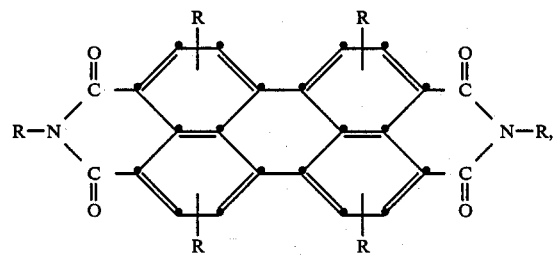
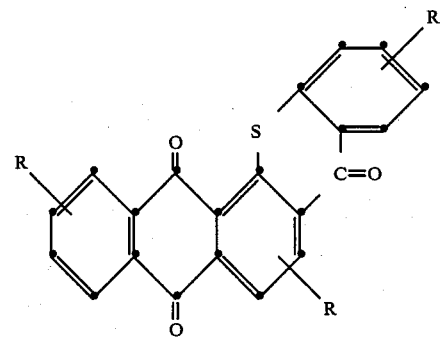

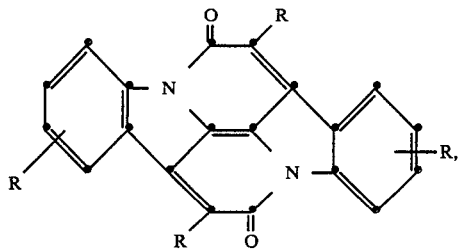
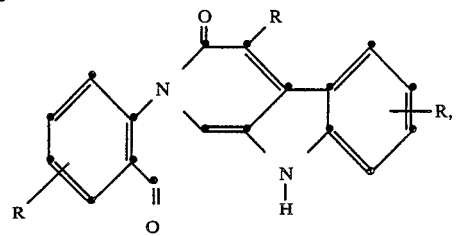
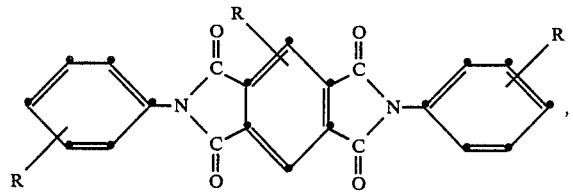
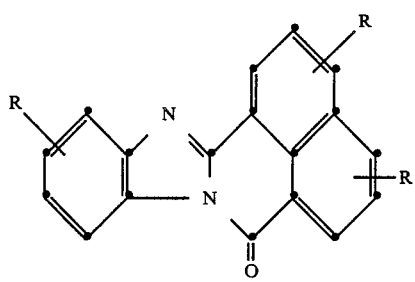
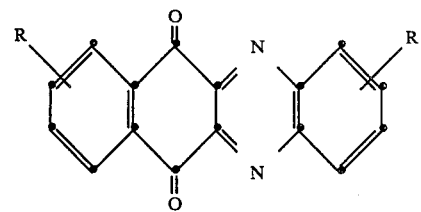
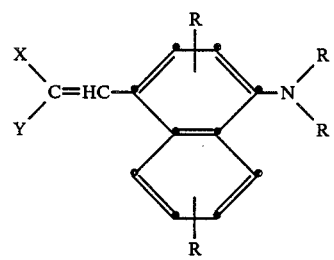
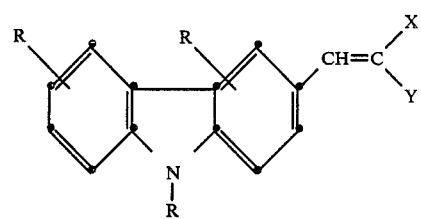
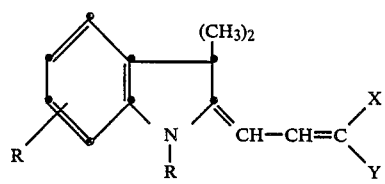
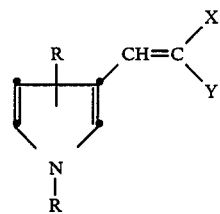
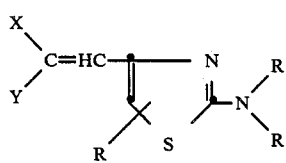
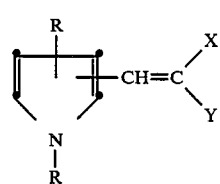
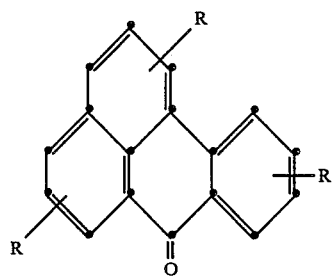
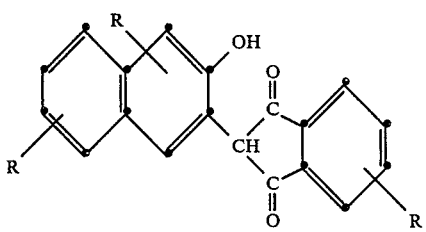

-continued
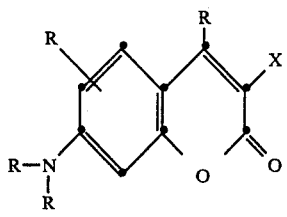
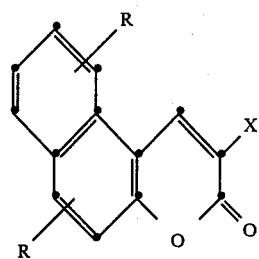
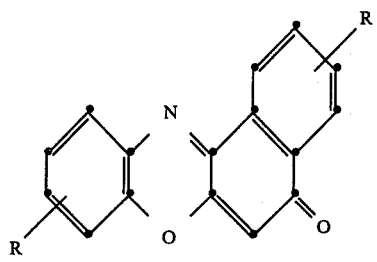
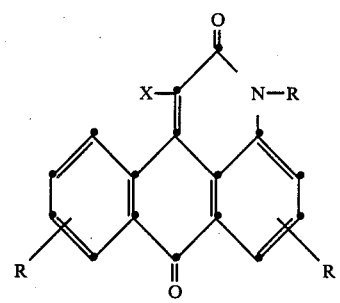
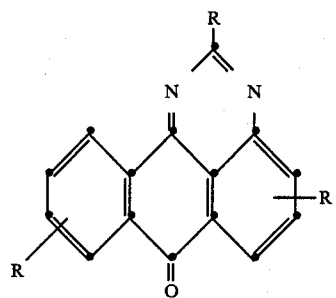
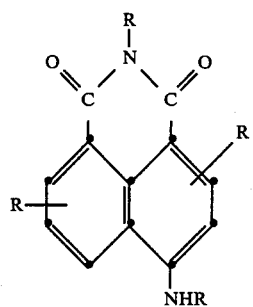
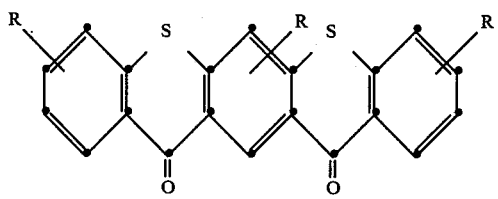
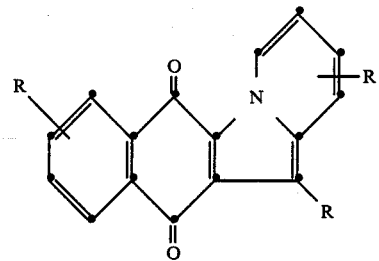
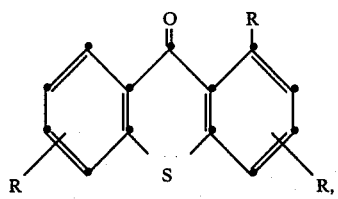
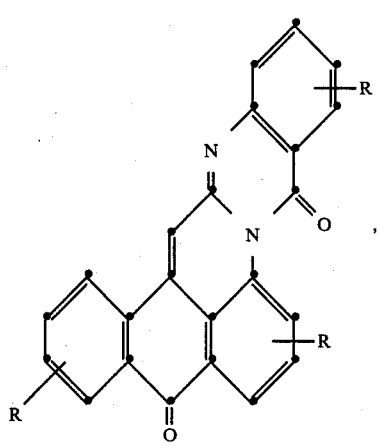

11
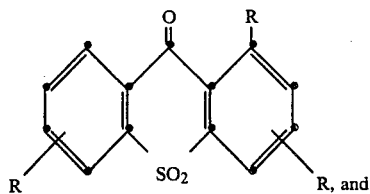
-continued
12
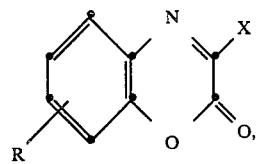
wherein the various R, X, and Y substitutents are as defined above.
Exemplary specific colorants are given below.
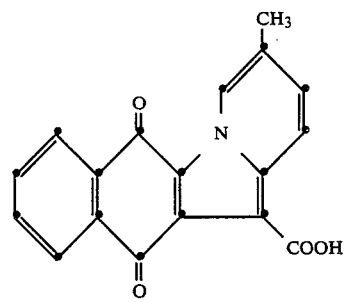
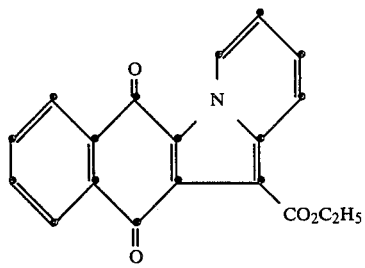
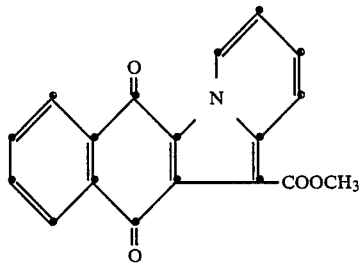
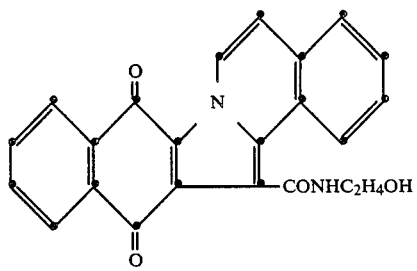
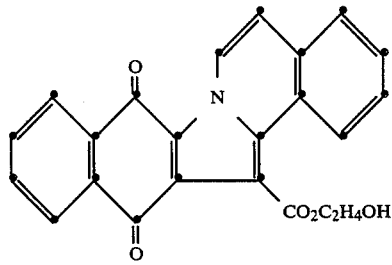
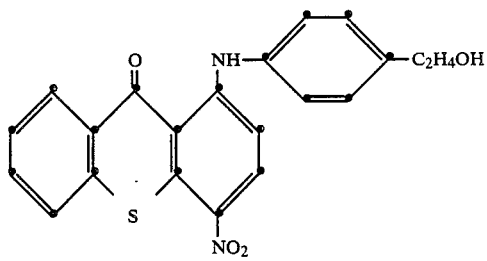
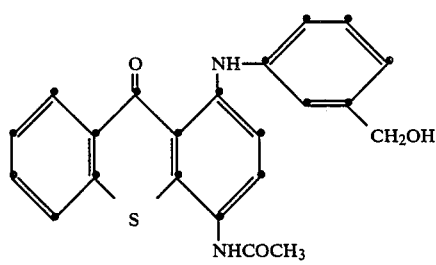
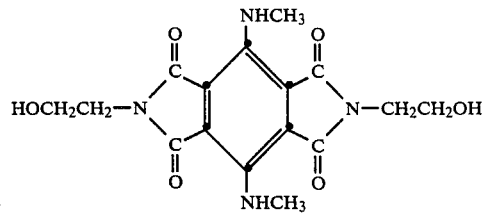

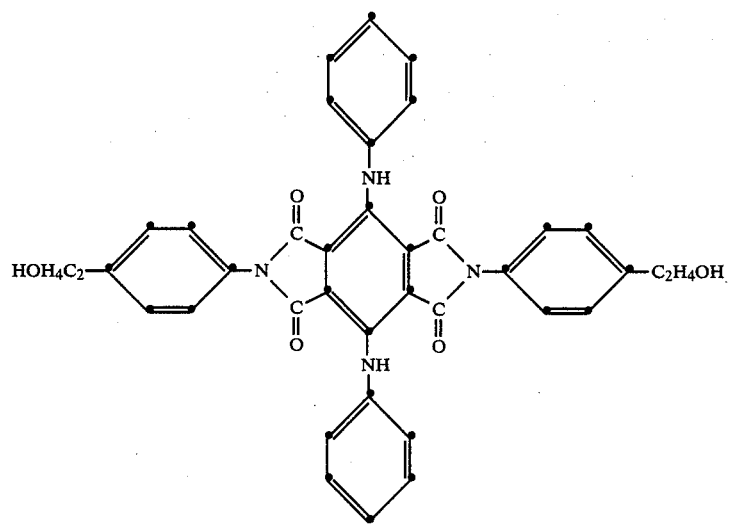
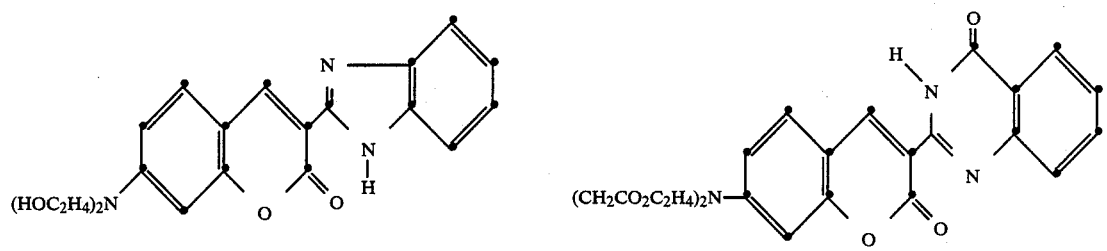
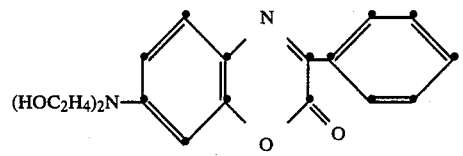
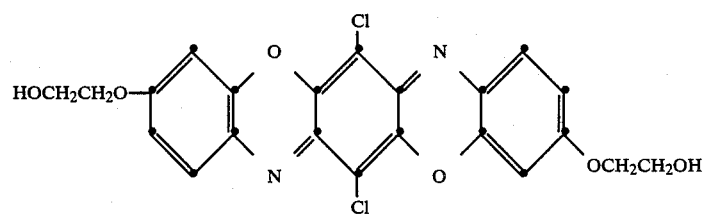
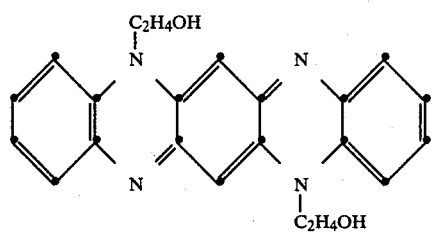
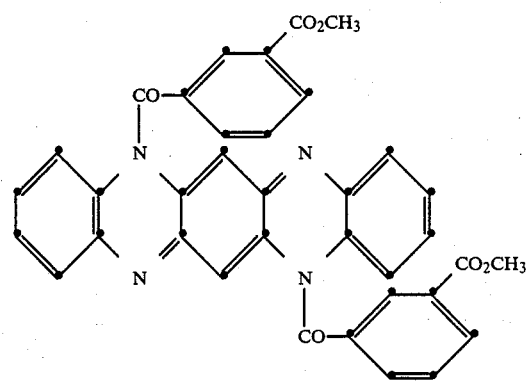

-continued
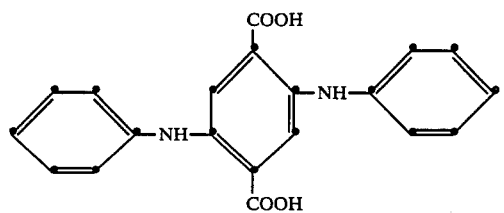 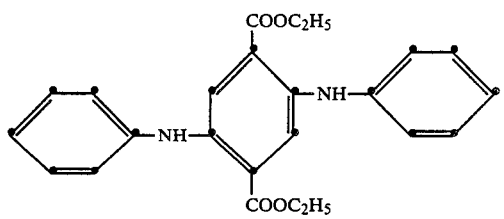
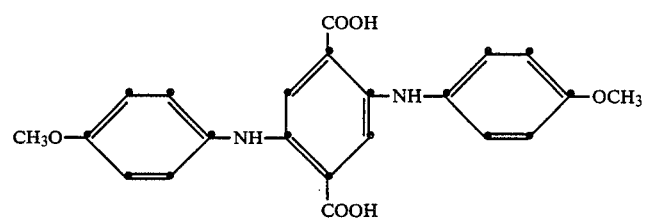
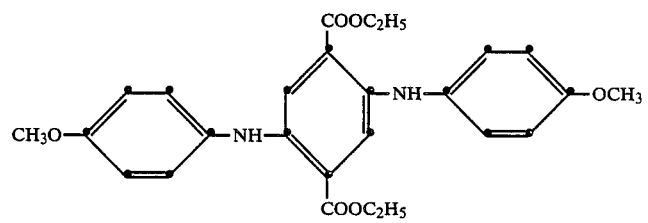
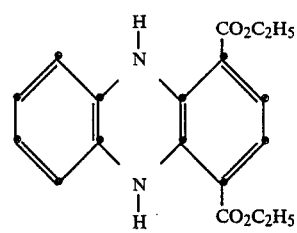 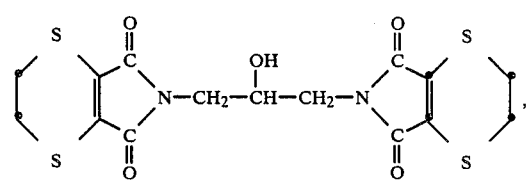
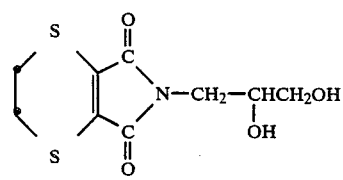 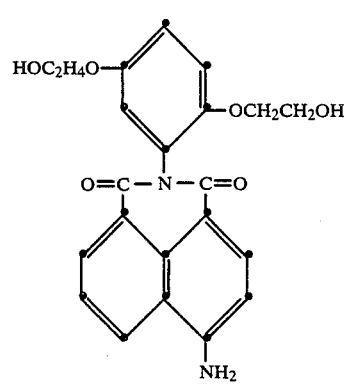

17
-continued
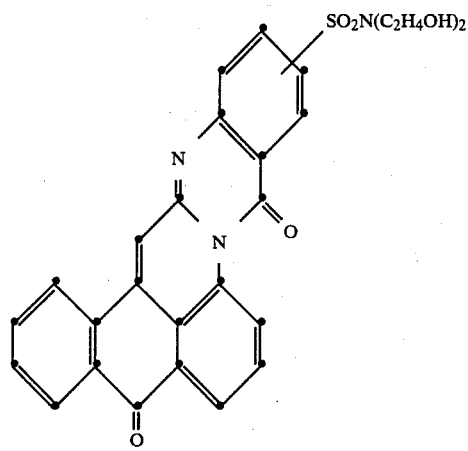
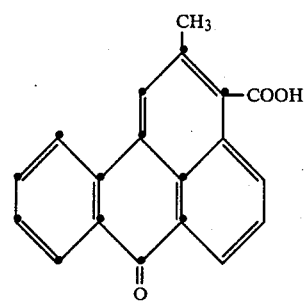
18
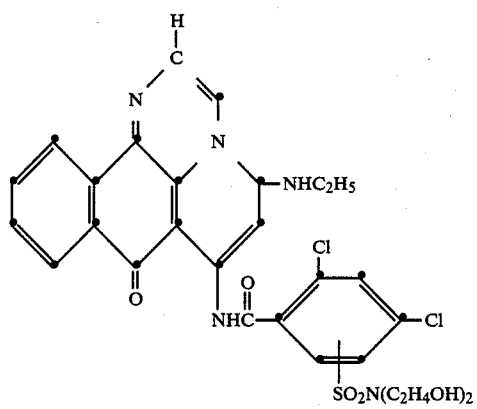
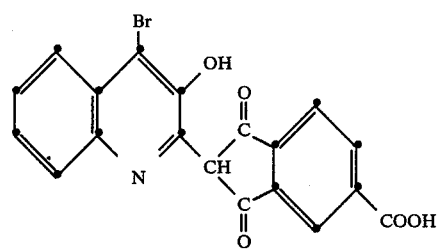
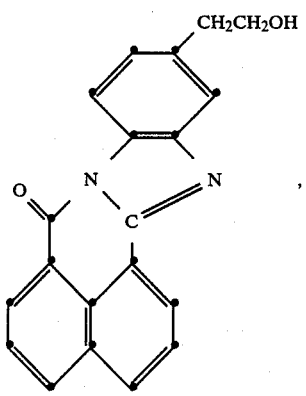
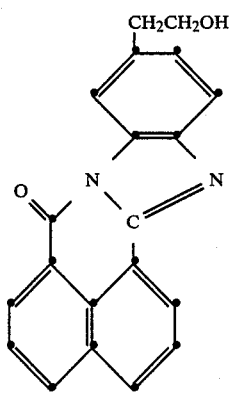
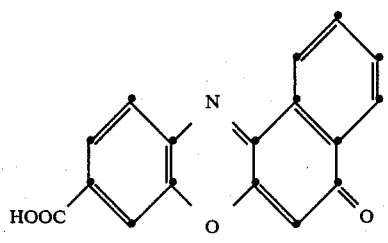
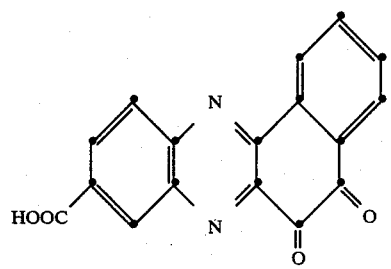

-continued
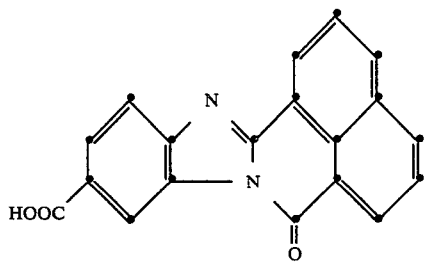
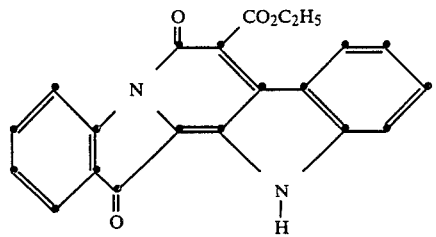
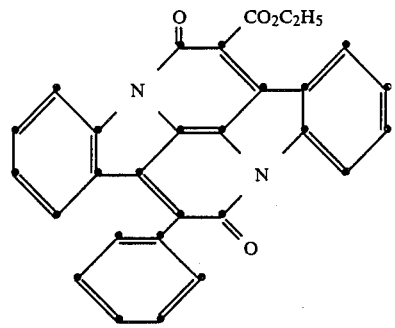
Other such useful colorants include those of the general formulae,
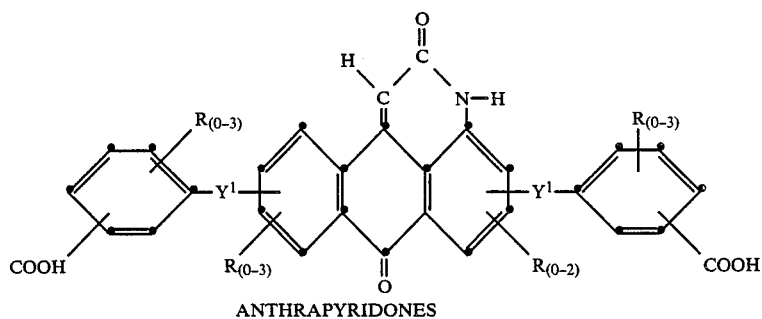
ANTHRAPYRIDONES
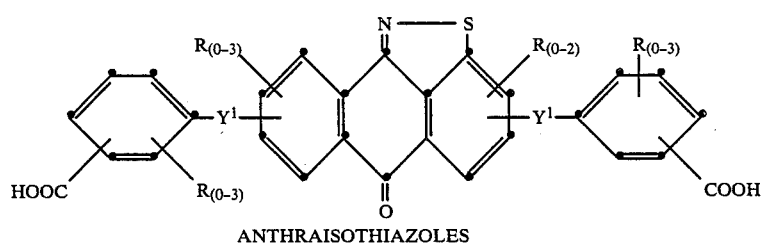
ANTHRAISOTHIAZOLES
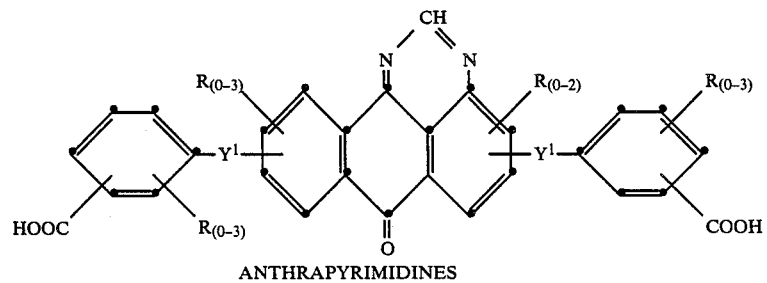
ANTHRAPYRIMIDINES

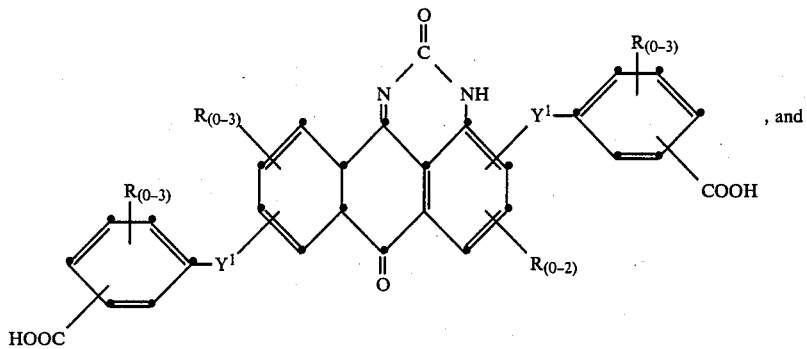

ANTHRAPYRIMIDONES

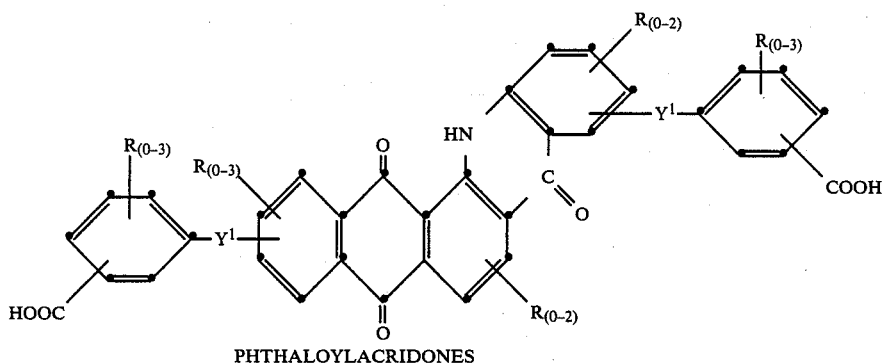

PHTHALOYLACRIDONES wherein each $Y^1$ is —NH— or —S— and each R represents 0–3 substituents as defined above. In these formulae, the —COOH substituents include the various esters thereof.

Preferred general chemical structures of colorants are given in formulas I, II, III, and IV below. See, for example, U.S. Pat. Nos. 4,403,092; 4,359,570; and 4,267,306.

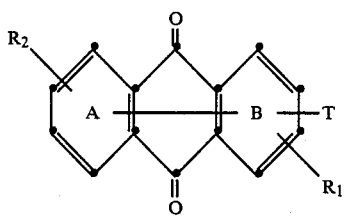

(I)

wherein: $R_1$ and $R_2$ each represents hydrogen or 1–3 substituents, depending on the number of T substituents present as defined below, said $R_1$ and $R_2$ being independently selected from alkyl, alkoxy, alkylamino, alkylsulfonyl, alkylsulfonylamino, alkanoylamino, aroylamino, alkylthio, arylamino, amino, cycloalkylamino, alkanoyl, aroyl, arylsulfonyl, $CF_3$, arylsulfamoyl, cyano, halogen, hydroxy, nitro, sulfamoyl, alkylsulfamoyl, dialkylsulfamoyl, carbamoyl, alkylcarbamoyl and dialkylcarbamoyl; and R is 1–4 independently selected substituents of the formula

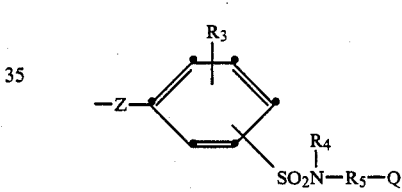

in any positions on rings A and/or B, wherein:

each Z is a divalent linking group independently selected from —NH—, —S—, —O—, —NHR—, —SR—, —SRS—, —SRO—, —SRSR—, —NHRO—, —NHRORO—, —NHRS—, —NHRSR—, —NHRN(COR)—, —NHRN($SO_2$R)—, —ORO—, —OR—, —OROR—, —ORORO—, —ORSR—, and —ORN(COR)RO—, wherein R is aralkylene, alkylene, arylene or cycloalkylene;

$R_3$ represents hydrogen or 1–3 substituents independently selected from alkyl, alkoxy, cyano, alkanoylamino, halogen, and alkylthio;

each $R_4$ is independently selected from hydrogen, alkyl, cycloalkyl, and aryl;

each $R_5$ is independently selected from alkylene, arylene, cycloalkylene, arylenealkylene, aryleneoxyalkylene, arylenethioalkylene, alkylenethioalkylene, alkyleneoxyalkylene, arylenedialkylene, and cyclohexylenedialkylene;

Q represents 1–3 groups independently selected from acyloxy, —OCOO-alkyl, hydroxy, carboxy, —COO-alkyl, —COO-aryl, and —COO-cycloalkyl;

and wherein the alkyl, alkylene, cycloalkyl, cycloalkylene, aryl and arylene moieties or segments of the above $R_1$–$R_5$ groups are unsubstituted or substituted with 1–3 of the following: hydroxy; halogen; cyano; amino; alkoxy; alkoxycarbonyl; aroyloxy; alkoxyalkoxy; hydroxyalkoxy; succinimido; glutarimido;

phthalimido; phthalimidino; 2-pyrolidono; cyclohexyl; phenoxy; phenyl; phenyl substituted with alkyl, alkoxy, alkoxycarbonyl, halogen, alkanoylamino or cyano; acrylamido; alkenyl; benzoylsulfonicimido; groups of the formula

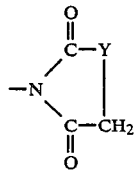

wherein Y is —NH—,

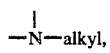

—O—, —S—, >CHOH, or —CH$_2$—O—; —S—R$^6$ wherein R$^6$ is selected from alkyl, alkyl substituted with 1-3 of halogen, hydroxy, phenoxy, aryl, cyano, cycloalkyl, alkylsulfonyl, alkylthio, alkanoyloxy, or alkoxy, phenyl, phenyl substituted with one or more of halogen, alkyl, alkoxy, alkanoylamino, cyano or alkoxycarbonyl, pyridyl, pyrimidinyl, 2-benzoxazolyl, 2-benzimidazolyl, 2-benzothiazolyl or

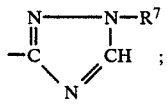

—SO$_2$R$^8$; —COOR$^8$; —OXR$^8$; —NH—X—R$^8$; —CONR$^7$R$^7$; —SO$_2$NR$^7$R$^7$; wherein X is —CO—, COO—, or —SO$_2$; R$^8$ is selected from alkyl, aryl, cycloalkyl, and each of these groups unsubstituted or substituted with 1-3 substituents independently selected from halogen, hydroxy, phenoxy, aryl, alkyl, cyano, cycloalkyl, alkylsulfonyl, alkylthio, alkanoyloxy, and alkoxy, and when X is —CO—, R$^8$ is further selected from hydrogen, amino, alkenyl, alkylamino, dialkylamino, arylamino and furyl; R$^7$ is selected from hydrogen, alkyl, aryl, alkoxysubstituted aryl, cycloalkyl, amino, alkylamino, dialkylamino, arylamino, furyl, and alkyl substituted with 1-3 of halogen, hydroxy, phenoxy, aryl, cyano, cycloalkyl, alkylsulfonyl, alkylthio, alkanoyloxy, or alkoxy; alkoxy substituted with 1-3 of hydroxy, cyano or alkanoyloxy; alkoxyalkoxy substituted with 1-3 of hydroxy, cyano, alkanoyloxy or alkoxy; and phenoxy substituted with 1-3 of alkyl, alkoxy or halogen;

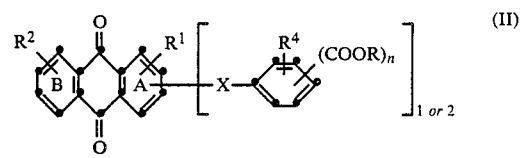

wherein either or both of rings A and B may contain in any position thereon one or two groups of the formula

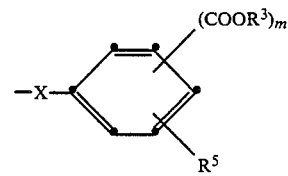

wherein:

R and R$^3$ each is selected from hydrogen, lower alkyl or hydroxy substituted lower alkyl;

R$^1$, R$^2$, R$^4$ and R$^5$ each represents hydrogen or 1-3 substituents selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkylsulfonyl, lower alkylthio, lower alkanoylamino, or cyclohexylamino;

and wherein each aforesaid aryl moiety is 6-10 carbons; X is —S— or —NH—; n is 1 or 2; m is 0, 1, or 2.

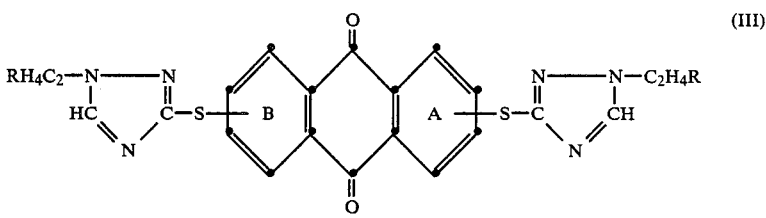

wherein R is —OH, —COOR$^1$ or —COX wherein R$^1$ is —H or lower alkyl, and X is halogen, either of rings A or B may contain one or more groups of the formula

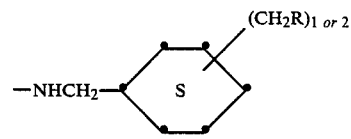

wherein R is as defined above, and each of rings A and B may be further substituted with 1-3 substituents selected from: lower alkyl which may be substituted with lower alkoxy, aryl, Cl, Br, or lower alkanoylamino; lower alkoxy which may be substituted with lower alkoxy, phenyl, Cl, Br, or lower alkanoylamino; chlorine; bromine; amino; lower alkyl amino which may be substituted with lower alkoxy, cyclohexyl, phenyl, Cl, Br, or lower alkanoylamino; aryl amino; arylthio; or aroylamino; lower alkylsulfonyl; lower alkylthio; lower alkanoylamino; or cyclohexylamino; wherein each aryl is 6-10 carbons.
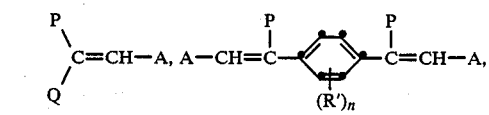 IV
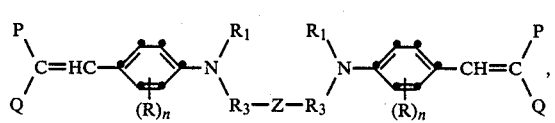
and
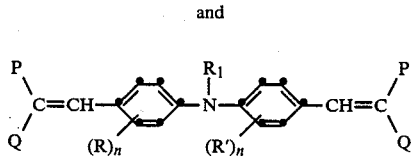
wherein each A is selected from the following radicals:
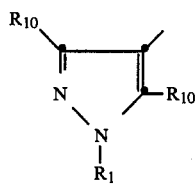
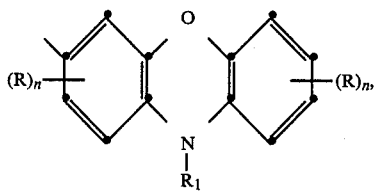
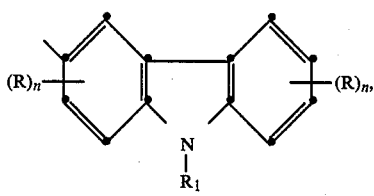
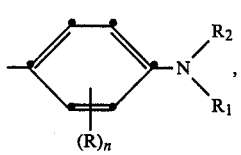
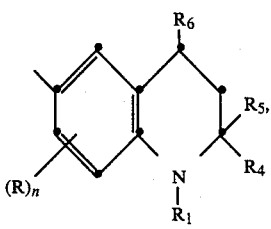
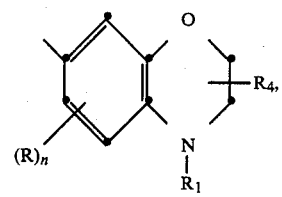
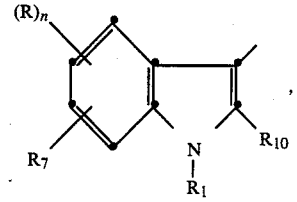
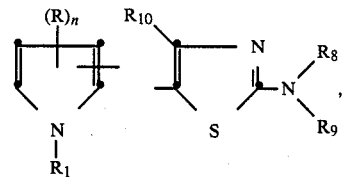
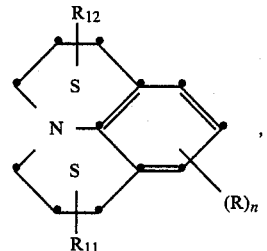
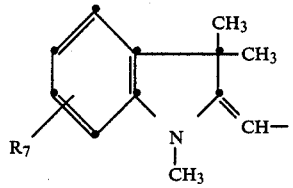
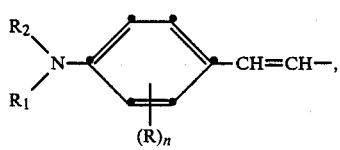
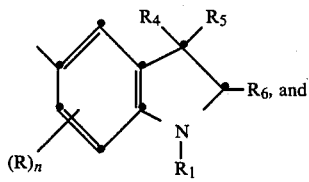
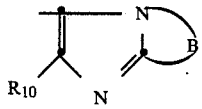
wherein:
R and R' are selected from hydrogen, fluorine, chlorine, bromine, alkyl, alkoxy, phenyl, phenoxy, alkylthio, or arylthio; n is 0, 1 or 2;

$R_1$ and $R_2$ are each selected from hydrogen; cycloalkyl; cycloalkyl substituted with one or two of alkyl, —OH, alkoxy, halogen, or hydroxy substituted alkyl; phenyl; phenyl substituted with alkyl, alkoxy, halogen, alkanoylamino, carboxy, cyano, or alkoxycarbonyl; straight or branched lower alkenyl; straight or branched alkyl of 1-8 carbons and such alkyl substituted with the following: hydroxy; halogen; cyano; succinimido; hydroxysuccinimido; acyloxysuccinimido; glutarimido; phenylcarbamoyloxy; phthalimido; 4-carboxyphthalimido; phthalimidino; 2-pyrrolidono; cyclohexyl; phenyl; phenyl substituted with alkyl, alkoxy, halogen, hydroxy alkanoylamino, carboxy, cyano, or alkoxycarbonyl; alkylsulfamoyl; vinylsulfonyl; acrylamido; sulfamyl; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

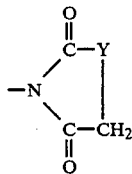

wherein Y is —NH—,

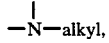

—O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, cyano, or alkoxycarbonyl; pyridyl; pyrimidinyl; benzoxazolyl; benzimidazolyl; benzothiazolyl; radicals of the formula

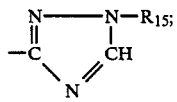

—OXR$_{16}$; —NHXR$_{16}$; —X—R$_{16}$; —CONR$_{15}$R$_{15}$; and —SO$_2$NR$_{15}$R$_{15}$; wherein R$_{15}$ is selected from H, aryl, alkyl, and alkyl substituted with halogen, —OH, phenoxy, aryl, —CN, cycloalkyl, alkylsulfonyl, alkylthio, alkanoyloxy, or alkoxy; X is —CO—, —COO—, or —SO$_2$—; R$_{16}$ is selected from alkyl and alkyl substituted with halogen, hydroxy, phenoxy, aryl, cyano, cycloalkyl, alkylsulfonyl, alkylthio, alkanoyloxy, and alkoxy; and when X is —CO—, R$_{16}$ also can be hydrogen, amino, alkenyl, alkylamino, dialkylamino, arylamino, aryl, or furyl; alkoxy; alkoxy substituted with hydroxy, cyano, alkanoyloxy, or alkoxy; phenoxy; phenoxy substituted with one or more of alkyl, carboxy, alkoxy, carbalkoxy, or halogen; R$_1$ and R$_2$ can be a single combined group such as pentamethylene, tetramethylene, ethyleneoxyethylene, ethylene sulfonylethylene, or

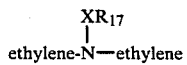

which, with the nitrogen to which it is attached, forms a ring and wherein R$_{17}$ is alkyl, aryl, or cycloalkyl;

R$_3$ is alkylene, arylene, aralkylene, or alkyleneoxyalkylene;

Z is selected from a direct single bond, —OCO—, —O—, —S—, —SO$_2$—, R$_{17}$SO$_2$N=,

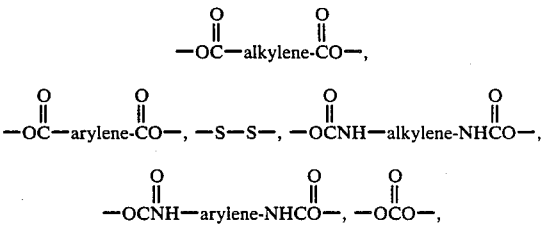

arylene, or alkylene;

R$_4$, R$_5$, and R$_6$ are each selected from hydrogen or alkyl;

R$_7$ is carboxy, carbalkoxy, or (R)$_n$;

R$_{10}$ is hydrogen, alkyl, or aryl;

R$_8$ and R$_9$ are each selected from hydrogen and substituted or unsubstituted alkyl, aryl, or cycloalkyl R$_{11}$ and R$_{12}$ are each selected from hydrogen, alkyl, hydroxyl, or acyloxy;

B represents the atoms necessary to complete a five- or six-membered ring and is selected from

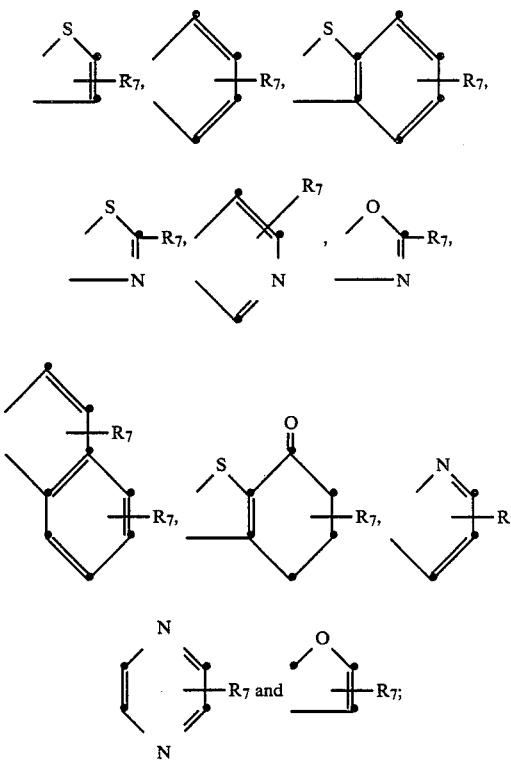

each P and Q is selected from cyano, carbalkenyloxy, carbcycloalkyloxy, carbalkoxy, carbaryloxy, carbaralkyloxy, carbamyl, carboxy, N-alkylcarbamyl, N-alkyl-N-arylcarbamyl, N,N-dialkylcarbamyl,N-arylcarbamyl, N-cyclohexylcarbamyl, aryl, 2-benzoxazolyl, 2-benzothiazolyl, 2-benzimidazolyl, napthyl, pyridyl, pyrimidinyl, 1,3,4-thiadiazol-2-yl, 1,3,4-oxadiazol-2-yl, SO$_2$ alkyl, SO₂ aryl, and acyl, or P and Q may be combined as

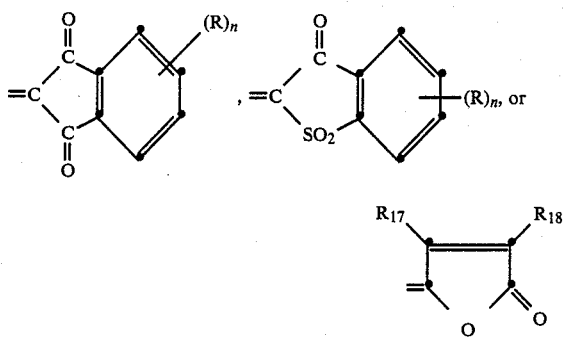

wherein R₁₇ is defined above and R₁₈ is CN, COOH, CO₂ alkyl, carbamyl, or N-alkylcarbamyl;

wherein at least one of A, P, and Q for each dye molecule must be or bear a condensable group selected from carboxy, carbalkoxy, carbaryloxy, N-alkylcarbamyloxy, acyloxy, chlorocarbonyl, carbamyloxy, N-(alkyl)₂carbamyloxy, amino, alkylamino, hydroxyl, N-phenylcarbamyloxy, cyclohexanoyloxy, or carbocyclohexyloxy;

wherein when an (R) substituent is present, n is any integer up to the available substitution sites on the ring; and wherein in the above definitions, each alkyl, aryl, or cycloalkyl moiety or portion of a group or radical may be substituted where appropriate with hydroxyl, acyloxy, alkyl, cyano, alkoxycarbonyl, halogen, alkoxy, or aryl, aryloxy, or cycloalkyl.

In further preferred embodiments of the invention:

(A) the water-dispersible polymeric material comprises (a) an acid component (moiety) of from about 75 to about 84 mole % isophthalic acid and conversely from about 25 to about 16 mole % 5-sodio-sulfoisophthalic acid, (c) a glycol component (moiety) of from about 45 to about 60 mole % diethylene glycol and conversely from about 55 to about 40 mole % 1,4-cyclohexanedimethanol or ethylene glycol or mixtures thereof, and (e) from about 0.5 to about 10 mole % of mono- or difunctional colorant material; with regard to the polymer, the term "moiety" as used herein designates the residual portion, for example, of the reactant acid or glycol or condensable derivative thereof which actually enters into or onto the polymer chain during the condensation or polycondensation reaction;

(B) the inherent viscosity of the water-dispersible polymeric material is from about 0.20 to about 0.38, the said acid component (moiety) comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;

(C) the polyester materials have an inherent viscosity of from about 0.28 to about 0.38, an acid moiety of from about 75 to about 84 mole % isophthalic acid and conversely from about 25 to about 16 mole % 5-sodiosulfoisophthalic acid, and a glycol moiety of from about 45 to about 60 mole % diethylene glycol and conversely from about 55 to about 44 mole % 1,4-cyclohexanedimethanol or ethylene glycol or mixtures thereof; and (C) the acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

The inherent viscosities (I.V.) of the particular polyester materials useful herein range from about 0.1 to about 1.0 determined according to ASTM D2857-70 procedure, in a Wagner Viscometer of Lab Glass, Inc. of Vineland N.J., having a ½ mL capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation:

$$(\eta)^{25° C.}_{0.50\%} = \frac{\ln \frac{t_s}{t_o}}{C}$$

wherein:
(η)=inherent viscosity at 25° C. at a polymer concentration of 0.25 g/100 mL of solvent;
ln=natural logarithm;
$t_s$=sample flow time;
$t_o$=solvent-blank flow time; and
C=concentration of polymer in grams per 100 mL of solvent=0.25.

The units of the inherent viscosity throughout this application are in deciliters/gram. It is noted that higher concentrations of polymer, e.g., 0.50 g of polymer/100 mL solvent may be employed for more precise I.V. determinations.

In general, for one particular utility of the present invention, the present colored water-dispersible polyester materials are excellent film formers for water-based printing inks. The polymers form stable solutions or dispersions in water and produce tough, flexible films on drying. Films will form at temperatures down to just above the freezing point of water. The polymers in dispersion form may be plasticized if necessary, for example, with certain water-immiscible phthalate esters to high degrees of flexibility. Printing inks prepared from the present concentrates are readily further water reducible (dilution) and the finished or press-ready inks typically comprise in % by weight, from about 55% to about 90% water, preferably from about 65% to about 75%, and from about 4% to about 30% colored, water-dispersible polymeric material, preferably from about 10% to about 25%, from about 1% to about 20% pigment, preferably from about 8% to about 15%. Various types of modifiers may be used such as up to about 10.0% polyvinyl alcohol or the like. The inks dry rapidly upon printing, wet surfaces exceptionally well and have excellent adhesion to many plastic films and metal foil as well as to paper, glass, polyethylene and many other substrates. Both the 100% solids, water-dissipatable polymers and the corresponding aqueous dispersions thereof may be further pigmented by conventional techniques.

The aforedescribed colored polyester material is prepared according to the polyester preparation technology described in U.S. Pat. Nos. 3,734,874; 3,779,993; and 4,233,196, the disclosures of which are incorporated herein by reference, and the use of the term "acid" in the above description and in the appended claims includes the various ester forming or condensable derivatives of the acid reactants such as the acid halides and dimethyl esters as employed in the preparations set out in these patents. Among the preferred sulfo-monomers are those wherein the sulfonate group is attached to an aromatic nucleus such as benzene, naphthalene, diphenyl, or the like, or wherein the nucleus is cycloaliphatic such as in 1,4-cyclohexanedicarboxylic acid.

Dispersal of the present polyester material in water may be done, for example, at preheated water temperature of about a 180° to about 200° F. and the polymer added as pellets to the vortex under high shear stirring. A Cowles Dissolver, Waring Blender, or similar equipment may be used. Once water is heated to temperature, additional heat input is not required. Depending upon the volume prepared, dispersal of the pellets by stirring should be complete within 15 to 30 minutes. Continued agitation with cooling may be desirable to prevent thickening at the surface due to water evaporation. Viscosities of the dispersions remain low up to nonvolatile levels of about 25%–30%, but generally increase sharply above these levels. Viscosities of the dispersions will be influenced by the degree of polymer dispersion (fineness) obtained which is affected by the dispersing temperature, shear, and time.

PRACTICE OF THE INVENTION—INCORPORATION OF DYE INTO THE POLYMER

Example 1

Components (a)–(g) comprising
(a) 79.54 g (0.41 m) dimethyl terephthalate,
(b) 26.64 g (0.09 m) dimethyl-5-sodiosulfoisophthalate,
(c) 54.06 g (0.51 m) diethylene glycol,
(d) 37.44 g (0.26 m) 1,4-cyclohexane dimethanol,
(e) 0.74 g (0.009 m) anhydrous sodium acetate,
(f) 100 ppm Ti catalyst as titanium-tetraisopropoxide, and
(g) 0.68 g (1.42×10$^{-3}$ m) red colorant (1,5-biscarboxyanilinoanthraquinone)

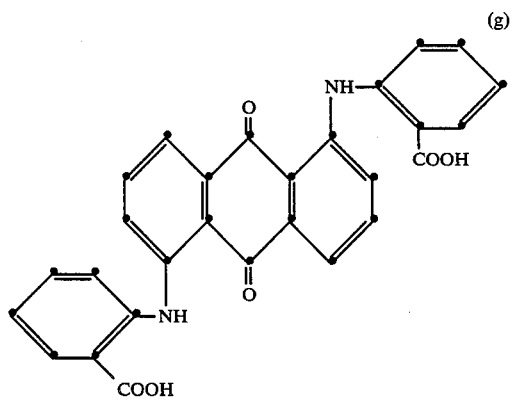

(g)

were added to a 500-mL round bottom flask that was fitted with a stirrer, condensate take off, and nitrogen inlet head. The flask and contents were immersed into a Belmont metal bath and heated for two hours at about 200°–220° C., while ester interchange and reaction of the colorant with ethylene glycol occurred. To carry out the polycondensation reaction, the temperature was increased to ~250° C. and the flask was held under vacuum of ≦0.5 mm Hg for about 45 minutes. The resulting polymer was dark red and had an I.V. of 0.323 and Tg=60.0° C. This polymer contains about 0.5% (wt/wt) red colorant, and is readily soluble in hot water producing a dark red aqueous solution.

Example 2

The procedure of Example 1 was repeated using 2.77 g (4.789×10$^{-3}$ m) of colorant (g), thus producing a polymer containing about 2.0% (wt/wt) of red colorant and having an I.V. of 0.270 and Tg=58.6° C.

Example 3

The procedure of Example 1 was repeated using 2.77 g (5.653×10$^{-3}$ m) of the blue colorant (h) below to produce a dark blue polymer having an I.V. of 0.274 and Tg=62.9° C.

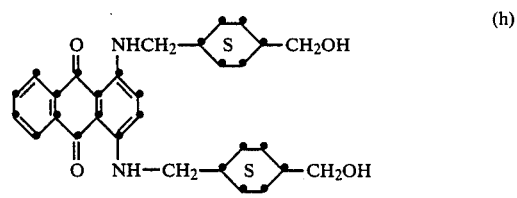

(h)

The polymer contains about 2.0% (wt/wt) of colorant and gives a dark blue solution in water at room temperature.

Example 4

The procedure of Example 1 was repeated using 13.59 g (0.028 m) of the blue colorant (h) to give a polymer containing about 10% (wt/wt) of colorant and having an I.V. of 0.286 and Tg=64.6° C.

All four of the above exemplary polymers were easily dissolved in hot water at the 25% solids level to produce stable solutions.

Example 5

Polyesters designated (a), (b), (c) and (d) may be prepared essentially in accordance with Example 1 of the aforementioned U.S. Pat. No. 4,233,196 from the following materials and including the condensable colorant of choice in molar proportions such as employed in any of Examples 1–4 above.

| (a) | g. moles |
|---|---|
| Dimethyl Isophthalate (IPA) | 0.415 |
| Dimethyl-5-Sodiosulfoisophthalate (SIP) | 0.085 |
| 1,4-Cyclohexanedimethanol (CHDM) | 0.520 |
| Carbowax 1000 (CW 1000) | 0.0237 |
| Sodium Acetate | 0.0085 |
| Irganox 1010 | 0.0085 |

The Carbowax 1000 has the structure H—(—OCH$_2$—CH$_2$—)$_n$OH wherein n is about 22. The polymer should analyze by NMR to contain (in reacted form) about 83 mole % IPA, about 17 Mole % SIP, about 94.5 mole % CHDM, and about 5.5 mole % of CW 1000, and have an I.V. of about 0.39.

| (b) | g. moles |
|---|---|
| Dimethyl Isophthalate | 0.328 |
| Dimethyl-5-Sodiosulfoisophthalate | 0.072 |
| 1,4-Cyclohexanedimethanol | 0.442 |
| Carbowax 400 (n = 10) | 0.058 |

-continued

| (b) | g. moles |
|---|---|
| Sodium Acetate | 0.0072 |

The polymer should analyze by NMR to contain (in reacted form) about 82 mole % IPA, about 18 mole % SIP, about 85.5 mole % CHDM and about 14.5 mole % CW 400, and have an I.V. of about 0.46.

| (c) | g. moles |
|---|---|
| Dimethyl Isophthalate | 0.41 |
| Dimethyl-5-Sodiosulfoisophthalate | 0.09 |
| 1,4-Cyclohexanedimethanol | 0.55 |
| Carbowax 4000 (n = 90) | 0.0005 |
| Sodium Acetate | 0.009 |

The polymer should analyze by NMR to contain (in reacted from) about 82 mole % IPA, about 18 mole % SIP, about 99.9 mole % CHDM and about 0.1 mole % CW 4000, and have an I.V. of about 0.16

| (d) | g. moles |
|---|---|
| Dimethyl Isophthalate | 0.205 |
| Dimethyl-5-Sodiosulfoisophthalate | 0.045 |
| Ethylene Glycol (EG) | 0.9638 |
| Carbowax 2000 (n = 45) | 0.03625 |
| Sodium Acetate | 0.0045 |

The polymer should analyze by NMR to contain (in reacted from) about 82 mole % IPA, about 18 mole % SIP, about 85.5 mole % EG and about 14.5 mole % CW 2000, and have an I.V. of about 0.34.

In such polymers containing the Carbowax material, the n value is preferably between about 6 and 150.

In accordance with the present invention, inks prepared from the present colored polymers, with or without various property modifiers such as polyvinyl alcohol, Pluronics ® or the like would have unexpectedly superior properties such as flow-out or printability, pigment wetting (where pigment is employed as co-colorant), temperature stability (heat and freeze-thaw), nonsettling for extended periods of time, nonpolluting with respect to odor and volatile organics, nonflocculating, wide viscosity, range inks, adhesion to a variety of substrates, hardness, gloss, drying rate on substrates, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging of printing plates, flexibility, redispersibility or rewetting, crinkle resistance, solvent resistance, alkali, chemical and detergent resistance, blocking resistance, lightfastness, toughness, substrate wetting, hold-out, dry-rate, and no offset on the printing press (coating, e.g., on tension rollers).

The following tables give exemplary colorant reactants useful in the present invention.

TABLE 1

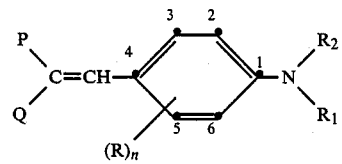

| $(R)_n$ | $R_1$ | $R_2$ | P, Q |
|---|---|---|---|
| H | CH$_2$CH$_2$OH | CH$_2$CH$_2$OH | CN, CN |
| H | CH$_2$CH$_2$OH | CH$_2$CH$_2$OH | CN, SO$_2$CH$_3$ |
| 3-CH$_3$ | CH$_2$CH$_2$OH | CH$_2$CH$_2$OH | CN, CONHC$_6$H$_5$ |
| 3-CH$_3$ | CH$_2$CH$_2$OH | CH$_2$CH$_2$OH | CN, SO$_2$CH$_3$ |
| H | CH$_2$CH$_2$OH | CH$_2$CH$_2$OH | CN, COC$_6$H$_5$ |
| H | CH$_2$CH$_2$OH | CH$_2$CH$_2$OH | CN, —C(=N–benzoxazolyl) |
| 3-CH$_3$ | CH$_2$CH(OH)CH$_3$ | C$_2$H$_5$ | CN, CO$_2$CH$_3$ |
| 2,5-di-OCH$_3$ | CH$_2$CH(OH)CH$_2$OH | C$_2$H$_5$ | CN, CONH$_2$ |
| 2-OCH$_3$, 5-CH$_3$ | C$_2$H$_5$ | C$_2$H$_5$ | CN, CO$_2$C$_2$H$_5$ |
| 2-OCH$_3$, 5-Cl | C$_2$H$_5$ | C$_2$H$_5$ | CN, CO$_2$C$_6$H$_5$ |
| 2-SCH$_3$ | C$_2$H$_5$ | C$_2$H$_5$ | CN, CO$_2$C$_6$H$_{11}$ |
| 2-OC$_6$H$_5$ | C$_2$H$_5$ | C$_2$H$_5$ | CN, CONHC$_2$H$_4$OH |
| 3-CH$_3$ | C$_2$H$_5$ | CH$_2$CH$_2$CO$_2$C$_2$H$_5$ | CN, —C(=N–(benzoxazolyl-CO$_2$C$_2$H$_5$)) |

TABLE 2

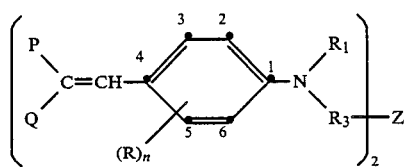

| (R)$_n$ | R$_1$ | R$_3$ | Z | P, Q |
|---|---|---|---|---|
| H | C$_2$H$_5$ | —CH$_2$CH$_2$— | —SO$_2$— | CN, CO$_2$CH$_3$ |
| 3-CH$_3$ | C$_2$H$_5$ | —CH$_2$CH$_2$— | —SO$_2$— | CN, CO$_2$CH$_3$ |
| 3-CH$_3$ | C$_2$H$_5$ | —CH$_2$CH$_2$— | —O— | CN, CO$_2$CH$_3$ |
| 3-CH$_3$ | C$_2$H$_5$ | —CH$_2$CH$_2$O— | —CH$_2$CH$_2$— | CN, CO$_2$CH$_3$ |
| 3-CH$_3$ | C$_2$H$_5$ | —CH$_2$CH$_2$— | —OCO— (O=C) | CN, CO$_2$CH$_3$ |
| 3-CH$_3$ | C$_2$H$_5$ | —CH$_2$— | —C$_6$H$_4$— | CN, CO$_2$CH$_3$ |
| 3-CH$_3$ | C$_2$H$_5$ | —CH$_2$CH$_2$— | —S—S— | CN, CO$_2$CH$_3$ |
| 3-CH$_3$ | C$_2$H$_5$ | —CH$_2$CH$_2$— | —OCCH$_2$CH$_2$CO— | CN, CO$_2$CH$_3$ |
| 3-CH$_3$ | C$_2$H$_5$ | —CH$_2$CH$_2$— | —OC(CH$_2$)$_4$CO— | CN, CO$_2$CH$_3$ |
| 3-CH$_3$ | C$_2$H$_5$ | —CH$_2$CH$_2$— | —NHC(CH$_2$)$_6$CNH— | CN, CO$_2$CH$_3$ |
| 3-CH$_3$ | C$_2$H$_5$ | —CH$_2$CH$_2$— | —CH$_2$—C$_6$H$_4$—CH$_2$— | CN, —C$_6$H$_4$—CO$_2$CH$_3$ |

TABLE 3

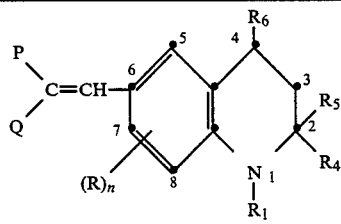

| (R)$_n$ | R$_1$ | R$_4$, R$_5$ | R$_6$ | P, Q |
|---|---|---|---|---|
| H | C$_2$H$_5$ | CH$_3$, CH$_3$ | CH$_3$ | CN, CO$_2$CH$_3$ |
| H | CH$_2$CH$_2$OH | CH$_3$, CH$_3$ | CH$_3$ | CN, SO$_2$CH$_3$ |
| H | CH$_2$CH$_2$OH | CH$_3$, CH$_3$ | CH$_3$ | CO$_2$CH$_3$, CO$_2$CH$_3$ |
| H | CH$_2$CH$_2$OH | CH$_3$, CH$_3$ | CH$_3$ | CN, SO$_2$C$_6$H$_5$ |
| 7-CH$_3$ | CH$_2$CH$_2$OH | CH$_3$, CH$_3$ | CH$_3$ | CN, CO$_2$C$_2$H$_5$ |
| 7-CH$_3$ | C$_2$H$_4$OOCCH$_3$ | CH$_3$, CH$_3$ | CH$_3$ | CN, CN |
| 7-CH$_3$ | C$_2$H$_4$OCNH—C$_6$H$_5$ | CH$_3$, CH$_3$ | CH$_3$ | CN, CN |
| 7-CH$_3$ | C$_2$H$_4$CN | CH$_3$, CH$_3$ | CH$_3$ | CN, CO$_2$CH$_3$ |
| 7-CH$_3$ | C$_2$H$_4$OH | CH$_3$, CH$_3$ | CH$_3$ | CN, CONHC$_6$H$_5$ |

TABLE 3-continued

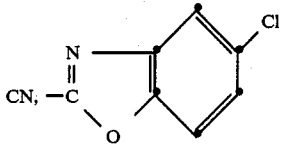

| (R)n | R₁ | R₄, R₅ | R₆ | P, Q |
|---|---|---|---|---|
| 7-CH₃ | C₂H₄OH | CH₃, CH₃ | CH₃ | 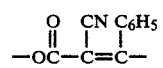 |
| 7-CH₃ | C₂H₄OH | CH₃, CH₃ | CH₃ | 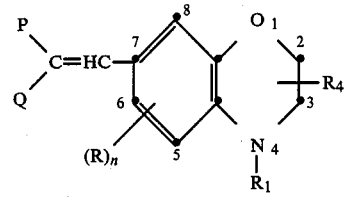 |

TABLE 4

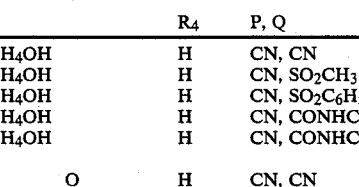

| (R)n | R₁ | R₄ | P, Q |
|---|---|---|---|
| H | C₂H₄OH | H | CN, CN |
| H | C₂H₄OH | H | CN, SO₂CH₃ |
| H | C₂H₄OH | H | CN, SO₂C₆H₅ |
| H | C₂H₄OH | H | CN, CONHC₆H₅ |
| H | C₂H₄OH | H | CN, CONHC₂H₄OH |
| H | CH₂CH₂OCOCH₃ | H | CN, CN |
| H | CH₂CH₂OCOCH₃ | H | CN, SO₂CH₃ |
| 6-CH₃ | CH₂CH₂OCOCH₃ | H | CN, CO₂CH₃ |
| 6-CH₃ | CH₂CH₂OCO—C₆H₅ | 3-CH₃ | CN, CO₂CH₃ |
| 6-CH₃ | CH₂CH₂OCOCH₃ | 3-CH₃ | 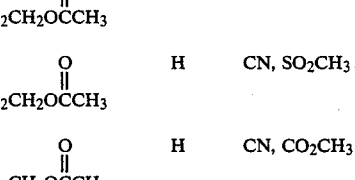 |

TABLE 5

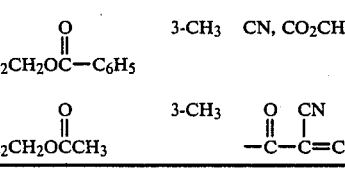

| R₇ | R₁ | R₁₀ | P, Q |
|---|---|---|---|
| H | CH₃ | CH₃ | CN, CO₂CH₃ |
| H | CH₃ | C₆H₅ | CN, CO₂CH₃ |

TABLE 5-continued

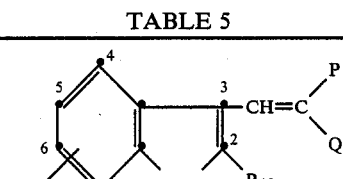

| R₇ | R₁ | R₁₀ | P, Q |
|---|---|---|---|
| H | H | C₆H₅ | CN, CO₂C₂H₅ |
| H | 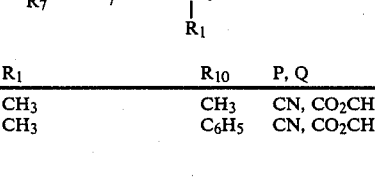 CHCHOCCH | C₆H₅ | CN, SO₂CH₃ |
| H | CH₂CH₂OCOCH₃ | C₆H₅ | CN, SO₂C₆H₅ |
| H | CH₂CH₂OCOCH₃ | C₆H₅ | CN, CN |
| H | CH₂CH₂OCOCH₃ | C₆H₅ | 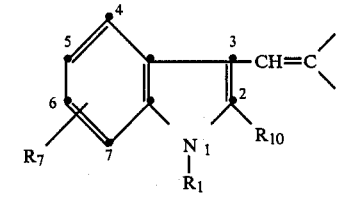 |
| H | CH₂CH₂OCOCH₃ | C₆H₅ | CN, CONHC₆H₅ |
| H | CH₂CH₂OH | C₆H₅ | 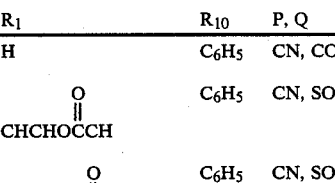 |

TABLE 6

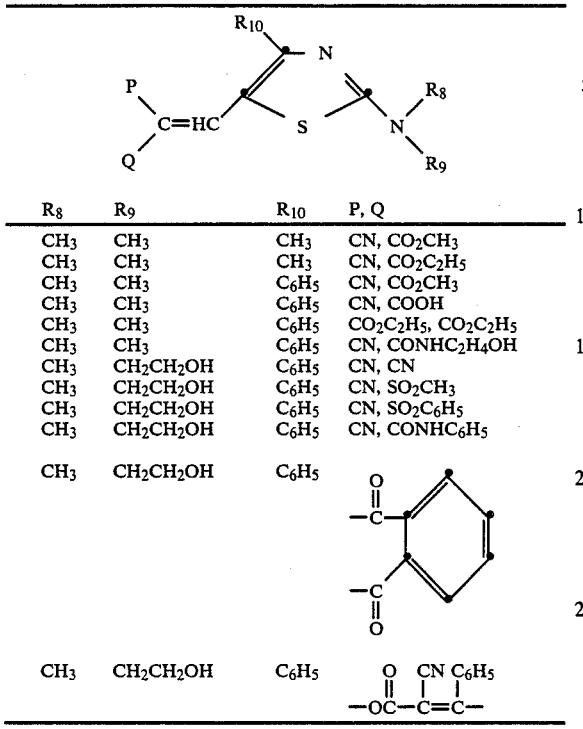

| R8 | R9 | R10 | P, Q |
|---|---|---|---|
| $CH_3$ | $CH_3$ | $CH_3$ | CN, $CO_2CH_3$ |
| $CH_3$ | $CH_3$ | $CH_3$ | CN, $CO_2C_2H_5$ |
| $CH_3$ | $CH_3$ | $C_6H_5$ | CN, $CO_2CH_3$ |
| $CH_3$ | $CH_3$ | $C_6H_5$ | CN, COOH |
| $CH_3$ | $CH_3$ | $C_6H_5$ | $CO_2C_2H_5$, $CO_2C_2H_5$ |
| $CH_3$ | $CH_3$ | $C_6H_5$ | CN, $CONHC_2H_4OH$ |
| $CH_3$ | $CH_2CH_2OH$ | $C_6H_5$ | CN, CN |
| $CH_3$ | $CH_2CH_2OH$ | $C_6H_5$ | CN, $SO_2CH_3$ |
| $CH_3$ | $CH_2CH_2OH$ | $C_6H_5$ | CN, $SO_2C_6H_5$ |
| $CH_3$ | $CH_2CH_2OH$ | $C_6H_5$ | CN, $CONHC_6H_5$ |
| $CH_3$ | $CH_2CH_2OH$ | $C_6H_5$ | 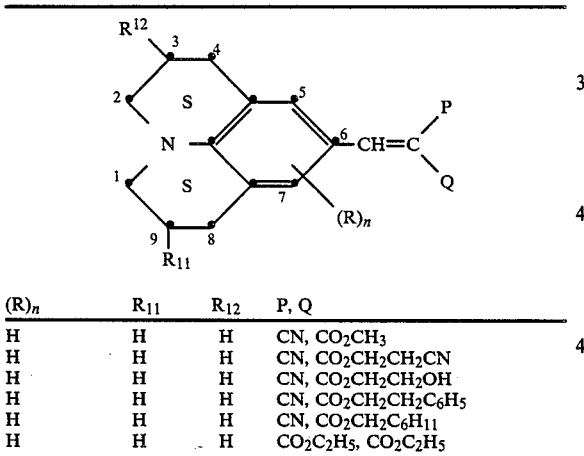 |
| $CH_3$ | $CH_2CH_2OH$ | $C_6H_5$ | $-OC(=O)-C(CN)=C(C_6H_5)-$ |

TABLE 7

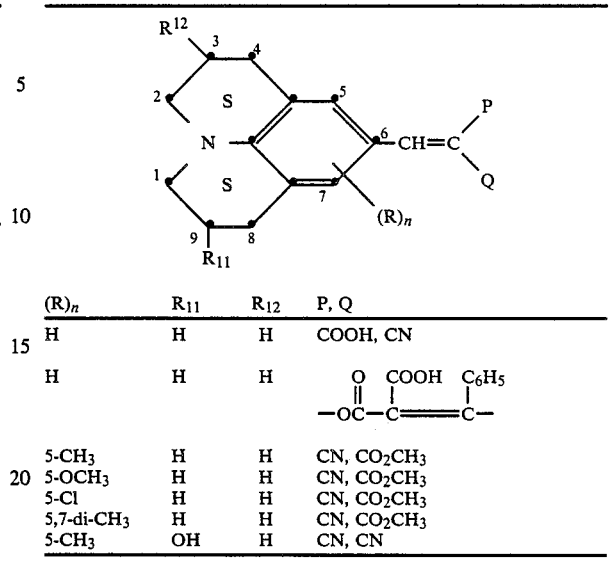

| (R)n | R11 | R12 | P, Q |
|---|---|---|---|
| H | H | H | CN, $CO_2CH_3$ |
| H | H | H | CN, $CO_2CH_2CH_2CN$ |
| H | H | H | CN, $CO_2CH_2CH_2OH$ |
| H | H | H | CN, $CO_2CH_2CH_2C_6H_5$ |
| H | H | H | CN, $CO_2CH_2C_6H_{11}$ |
| H | H | H | $CO_2C_2H_5$, $CO_2C_2H_5$ |

TABLE 7-continued

| (R)n | R11 | R12 | P, Q |
|---|---|---|---|
| H | H | H | COOH, CN |
| H | H | H | $-OC(=O)-C(COOH)=C(C_6H_5)-$ |
| 5-$CH_3$ | H | H | CN, $CO_2CH_3$ |
| 5-$OCH_3$ | H | H | CN, $CO_2CH_3$ |
| 5-Cl | H | H | CN, $CO_2CH_3$ |
| 5,7-di-$CH_3$ | H | H | CN, $CO_2CH_3$ |
| 5-$CH_3$ | OH | H | CN, CN |

TABLE 8

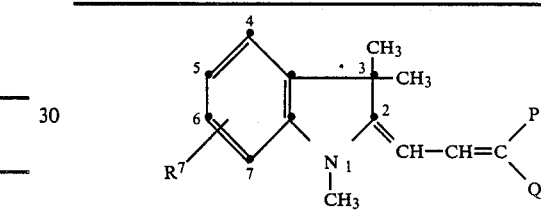

| R7 | P, Q |
|---|---|
| H | CN, $CO_2CH_3$ |
| H | $CO_2CH_2CH_3$, $CO_2CH_2CH_3$ |
| H | $CO_2CH_3$, $SO_2CH_3$ |
| H | $CO_2CH_3$, $SO_2C_6H_5$ |
| H | CN, $CONHC_2H_4OH$ |
| H | CN, $CO_2CH_2CH_2OH$ |
| H | CN, $CO_2CH_2CH_2OC_2H_5$ |
| H | CN, $CO_2CH_2CH_2Cl$ |
| H | CN, $CO_2CH_2CH_2C_6H_5$ |
| H | CN, $CO_2CH_2CH_2OC_6H_5$ |
| H | CN, $CO_2C_6H_5$ |
| H | CN, $CO_2C_6H_{11}$ |
| H | CN, $CO_2CH_2C_6H_{11}$ |
| H | CN, $CO_2CH_2C_6H_5$ |
| 5-$CH_3$ | CN, $CO_2CH_2CH(CH_3)_2$ |

TABLE 9

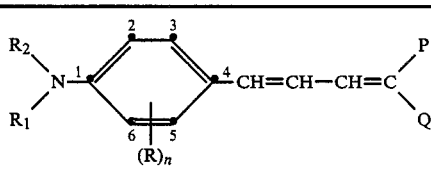

| (R)n | R1 | R2 | P, Q |
|---|---|---|---|
| H | $CH_3$ | $CH_3$ | CN, $CO_2C_2H_5$ |
| H | $CH_3$ | $CH_3$ | CN, $CO_2C_2H_4OH$ |
| 3-$CH_3$ | $CH_3$ | $CH_3$ | CN, $CO_2CH_3$ |
| 3-$OC_2H_5$ | $CH_3$ | $CH_3$ | CN, $CO_2CH_3$ |
| 3-Cl | $CH_3$ | $CH_3$ | CN, $CO_2CH_2CH_2CN$ |
| 2-$OCH_3$, 5-$CH_3$ | $C_2H_5$ | $C_2H_5$ | CN, $CO_2CH_2CH_2OCH_3$ |
| 2,5-di-$OCH_3$ | $C_2H_5$ | $C_2H_5$ | CN, $CO_2C_6H_5$ |
| 2,5-di-$CH_3$ | $C_2H_5$ | $C_2H_5$ | CN, $CO_2CH_2CH_2C_6H_5$ |
| 3-$CH_3$ | $C_4H_{9-n}$ | $C_4H_{9-n}$ | CN, $CO_2CH_2CH_2OC_6H_5$ |
| 3-$C_2H_5$ | $CH_2CH(CH_3)_2$ | $C_2H_5$ | CN, $CONHC_2H_4OH$ |
| H | $C_6H_5$ | $C_2H_5$ | CN, $CO_2CH_3$ |

TABLE 9-continued

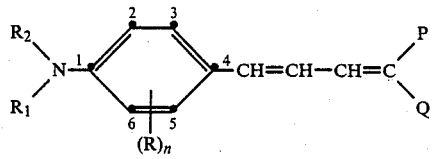

| (R)n | R₁ | R₂ | P, Q |
|---|---|---|---|
| 3-OCH₃ | C₆H₅ | C₂H₅ | CN, CO₂CH₃ |
| H | C₆H₅ | C₆H₅ | CN, CO₂CH₃ |
| H | C₆H₅ | C₆H₅ | CO₂C₂H₅, CO₂C₂H₅ |
| H | C₆H₁₁ | C₆H₁₁ | CN, CO₂CH₃ |

TABLE 10

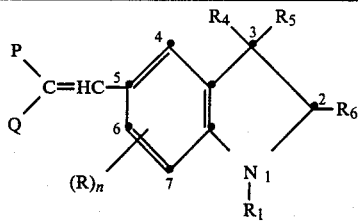

| (R)n | R₁ | R₄, R₅ | R₆ | P, Q |
|---|---|---|---|---|
| H | CH₃ | CH₃, CH₃ | CH₃ | CN, CO₂CH₃ |
| H | CH₃ | CH₃, CH₃ | CH₃ | CN, CO₂C₂H₄OH |
| H | CH₃ | CH₃, CH₃ | CH₃ | CN, CONHC₂H₄OH |
| H | CH₃ | CH₃, CH₃ | CH₃ | CN, CO₂CH₂CH₂CN |
| H | CH₃ | CH₃, CH₃ | CH₃ | CN, CO₂CH₂CH₂OC₂H₅ |
| H | CH₃ | CH₃, CH₃ | CH₃ | CN, CO₂CH₂CH₂C₆H₅ |
| H | CH₃ | CH₃, CH₃ | CH₃ | CN, CO₂CH₂C₆H₅ |
| H | CH₃ | CH₃, CH₃ | CH₃ | CN, CO₂CH₂CH₂OC₆H₅ |
| H | CH₂CH₂Cl | CH₃, CH₃ | CH₃ | CN, CO₂C₂H₅ |
| H | CH₂CH₂OH | CH₃, CH₃ | CH₃ | CO₂C₂H₅, CO₂C₂H₅ |
| H | CH₂CH₂OC₆H₅ | CH₃, CH₃ | CH₃ | CO₂CH₃, SO₂CH₃ |
| H | CH₂CH₂OC(O)CH₃ | CH₃, CH₃ | CH₃ | CN, CN |
| H | CH₂CH₂OC(O)CH₃ | CH₃, CH₃ | CH₃ | CN, SO₂C₆H₅ |

TABLE 11

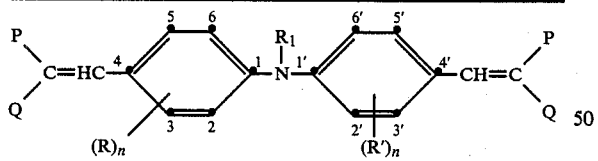

| (R)n | (R')n | R₁ | P, Q |
|---|---|---|---|
| H | H | CH₂CH₂OH | CH, CN |
| H | H | CH₂CH₂OH | CN, CONH₂ |
| H | H | CH₂CH₂OH | CN, CO₂CH₃ |
| H | H | CH₂CH₂OH | CN, CONHC₆H₅ |
| H | H | CH₂CH₂OH |  |
| H | H | CH₂CH₂OC(O)CH₃ | CN, CN |

TABLE 11-continued

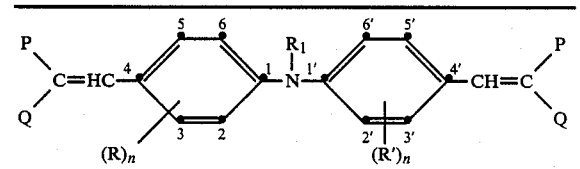

| (R)n | (R')n | R₁ | P, Q |
|---|---|---|---|
| H | H | CH₂CH₂OC(O)CH₃ | CN, CO₂CH₃ |
| H | H | CH₂CH₂OC(O)CH₃ | CN, SO₂CH₃ |
| H | H | CH₂CH₂OC(O)CH₃ | CN, SO₂C₆H₅ |
| H | H | H | CN, CN |
| H | H | CH₂CH₃ | CN, CN |

TABLE 12

[Structure: A—CH=C(P)— connected to benzene ring (positions 1-6) with (R)n substituents, and symmetric P, C=CH—A on other side]

| A | (R)n | P |
|---|------|---|
| (HOC₂H₄)₂N—C₆H₄— | H | CN |
| (CH₃C(O)OC₂H₄)₂N—(2-CH₃-C₆H₃)— | H | CN |
| [C₂H₅, CH₃C(O)CH₂CH₂]N—(2,5-di-CH₃-C₆H₃)— | H | CN |
| (CH₃)₂N—C₆H₄— | H | CO₂CH₃ |
| [C₂H₅, C₆H₅CH₂]N—C₆H₄— | H | CO₂CH₃ |
| [C₆H₁₁, C₂H₅]N—C₆H₄— | 2-CH₃ | CO₂CH₃ |
| [NCCH₂CH₂, CH₃COOCH₂CH₂]N—C₆H₄— | 2-Cl | CONH₂ |

TABLE 13

[Structure: carbazole-like fused ring system with P,Q—C=CH— at position 7, (R)n at positions 8,9 and 3,4, N₁—R₁ bridging]

| (R)n | R₁ | P, Q |
|------|----|----|
| H | C₂H₄OH | CN, CN |
| H | C₂H₄OH | CN, SO₂CH₃ |
| H | C₂H₄OH | CN, SO₂C₆H₅ |
| H | C₂H₄OH | CN, CONHC₆H₅ |
| H | C₂H₄OH | CN, CONHC₂H₄OH |
| H | CH₂CH₂OC(O)CH₃ | CN, CN |

TABLE 13-continued

| (R)n | R₁ | P, Q |
|------|----|----|
| H | CH₂CH₂OC(O)CH₃ | CN, SO₂CH₂ |
| 4,8-di-CH₃ | CH₂CH₂OC(O)CH₃ | CN, CO₂CH₃ |
| 8-CH₃ | CH₂CH₂OC(O)CH₃ | CN, CO₂CH₃ |
| 8-CH₃ | CH₂CH₂OC(O)C₆H₅ | CN, CO₂CH₃ |
| 8-CH₃ | CH₂CH₂OC(O)CH₃ | —OC(O)—C(CN)=C(C₆H₅)— |
| 8-CH₃ | CH₂CH(OH)CH₃ | —OC(O)—C(COOH)=C(C₆H₅)— |

TABLE 14

[Structure: diphenyl ether / N-linked system with P,Q—C=CH— at position 9, O¹ bridge, N₆—R₁, (R)n substituents]

| (R)n | R₁ | P, Q |
|------|----|----|
| H | C₂H₄OH | CN, CN |
| H | C₂H₄OH | CN, SO₂CH₃ |
| H | —CH₂—C₆H₄—COOH | CN, SO₂C₆H₅ |
| H | —CH₂—C₆H₄—COOH | CN, CONHC₆H₅ |
| H | C₂H₄OH | CN, CONHC₂H₄OH |
| H | CH₂CH₂OC(O)CH₃ | CN, CN |
| H | CH₂CH₂OC(O)CH₃ | CN, SO₂CH₃ |
| 8-CH₃ | CH₂CH₂OC(O)CH₃ | CN, CO₂CH₃ |
| 8-CH₃ | CH₂CH₂OC(O)C₆H₅ | CN, CO₂CH₃ |

TABLE 15

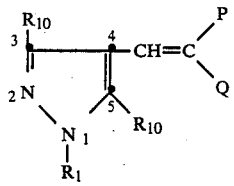

| R₁ | R₁₀ | P, Q |
|---|---|---|
| 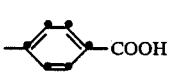—COOH | 3,5-di-CH₃ | CN, CN |
| CH₂——COOH | 3,5-di-C₆H₅ | CN, SO₂CH₃ |
| 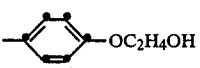—OC₂H₄OH | 5-CH₃ | CN, SO₂C₆H₅ |
| 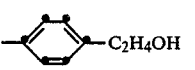—C₂H₄OH | 3-CH₃ | CN, CONHC₆H₅ |
|  (3-C₆H₅ ring with COOH) | 3-C₆H₅ | CN, CONHC₂H₄OH |
| CH₂—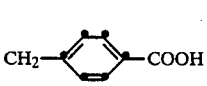—COOH | 3-C₆H₅ | CN, CN |
| CH₂—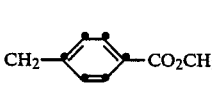—CO₂CH₃ | 3,5-di-C₆H₄—p-CH₃ | CN, SO₂CH₃ |

TABLE 16

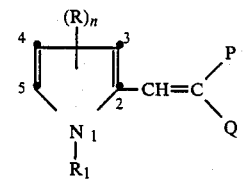

| (R)ₙ | R₁ | P, Q |
|---|---|---|
| H | CH₂CH₂OH | CN, CN |
| H | CH₂CH₂OH | CN, CO₂CH₃ |
| H | CH₂CH₂OCCH₃ (O) |  |
| 5-CH₃ | CH₃ | 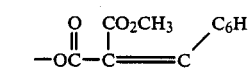 |

TABLE 16-continued

| (R)ₙ | R₁ | P, Q |
|---|---|---|
| 3-CH₃ | H |  |
| H | CH₂C₆H₄—p-COOH | 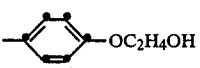 |

TABLE 17

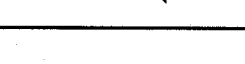

| (R)ₙ | R₁ | P, Q |
|---|---|---|
| 2,5-di-CH₃ | CH₃ | CN, CO₂CH₃ |
| H | H | 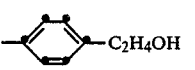 |
| H | CH₂C₆H₅ | 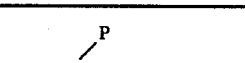 |
| H | CH₂C₆H₄—p-CO₂CH₃ |  |
| H | CH₂—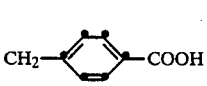—COOH | 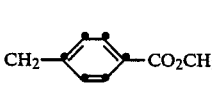 |
| 2,5-di-CH₃ | C₆H₅ | CN, CO₂CH₃ |
| 2,5-di-CH₃ | C₆H₄—p-COOH | 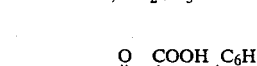 |

TABLE 18
Substituted 3H—Dibenzo[f,ij]Isoquinoline-2,7-Diones

| R | —X—R₁—Z | R₂ | R₄ | R₃ |
|---|---------|----|----|----|
| CH₃ | NHC₂H₄OH | NC— | H | H |
| CH₃ | NH—C₆H₃(OC₂H₄OH) (para) | NC— | H | H |
| CH₃ | NH—C₆H₂(CH₂OH)(CH₃)(CH₂OH) | NC— | H | H |
| H | —H | —NHC₂H₄OH | 9-Cl | |
| CH₂CH₂OH | —H | —NHC₆H₄—m-Cl | 9-CH₃ | CF₃ |
| —CH₃ | —S—C(=N—CH)—N(N—CH₂CH₂OH) | —CN | H | C₆H₅ |
| —CH₂CH₂OH | —S—C₂H₄OH | —COCH₃ | H | OC₆H₅ |
| —CH₃ | —NH—C₆H₄—p-CH₂—CH₂OH | —COOC₂H₅ | H | CN |
| —CH₃ | —NH—C₆H₄—m-CH₂OH | —COCH₃ | 10-CH₃ | OC₂H₅ |
| —CH₃ | —NH—C₆H₄—(o, m or p)-CH₃ | —COOC₂H₅ | 9-OC₂H₅ | SC₂H₅ |
| —CH₃ | —NH—C₆H₅ | —COOC₂H₅ | 9-NHC₂H₅ | COC₆H₅ |
| —CH₃ | —NHC₂H₄OH | —COC₆H₅ | H | SC₆H₅ |
| —CH₃ | NHC₂H₄OH | —COOC₂H₅ | H | OC₂H₄OH |
| CH₃ | —NH—C₆H₂(CH₂OH)(CH₃)(CH₂OH) | —CN | H | COCH₃ |
| —CH₃ | —NH—C₆H₃(CH₃)(SO₂NHC₂H₄OH) | —CN | H | SO₂CH₃ |
| —CH₃ | —NH—C₆H₃(CH₃)(SO₂NHC₂H₄OH) | —COOC₂H₅ | H | COOCH₃ |
| —CH₃ | —NHC₂H₄OH | —CN | H | SO₂C₆H₅ |
| —CH₃ | —NH—C₆H₄—o-CH₃ | —CN | 9-COOCH₃ | CF₃ |
| —CH₃ | —NH—C₆H₄—m-CH₂OH | —CN | H | CH₃ |

TABLE 18-continued

Substituted 3H—Dibenzo[f,ij]Isoquinoline-2,7-Diones

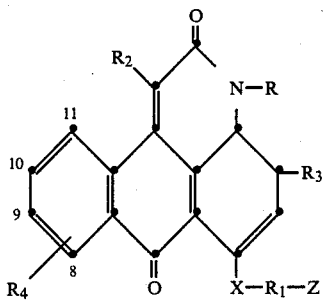

| R | —X—R₁—Z | R₂ | R₄ | R₃ |
|---|---|---|---|---|
| —CH₃ | —NH—C₆H₄—(o, m or p)C₂H₄OCOCH₃ | —CN | H | OCH₃ |

TABLE 19

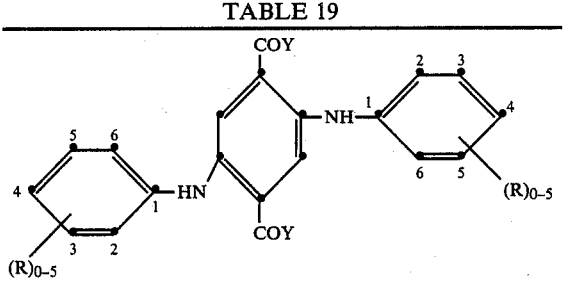

| Y | R |
|---|---|
| OH | 4-CH₃ |
| OH | 2-OC₂H₅ |
| OH | 3-CH₃ |
| OH | 2,4-di-CH₃ |
| OH | 2,5-di-OCH₃ |
| OH | 2,5-di-Cl |
| OH | 2,4-di-OC₂H₅ |
| Cl | 4-Cl |
| OH | 3-Br |
| OH | 3-CF₃ |
| OH | 4-C₂H₅ |
| OH | 4-S—C₄H₉—n |
| OH | 4-OC₆H₅ |
| OH | 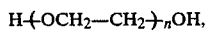 |
| OH | 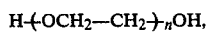 |

The invention has been described in detail with particular reference to preferred embodiments thereof, but it will be understood that variations and modifications can be effected within the spirit and scope of the invention.

We claim:

1. Composition of matter comprising water-dispersible polymeric material having linking groups comprising at least 20 mole % carbonyloxy and up to about 80 mole % carbonylamido, said material containing water-solubilizing sulfonate groups and having reacted onto or into the polymer backbone from about 0.01 to about 40 mole % based on the total of all reactant hydroxy, carboxy or amino equivalents, or the condensable derivative equivalents thereof, of colorant comprising one or more heat stable organic compounds initially having at least one condensable group.

2. The composition of claim 1, wherein the polymer has an inherent viscosity of from about 0.1 to about 1.0 measured in a 60/40 parts by weight solution of phenol/tetrachloroethane at 25° C. and at a concentration of 0.25 gram of polymer in 100 mL of the solvent, the polymer containing substantially equimolar proportions of acid equivalents (100 mole percent) to hydroxy and amino equivalents (100 mole percent), the polymer comprising the reaction residues of the following reactants (a), (b), (c), (d), and (e) or the ester forming or esteramide forming derivatives thereof:

(a) at least one difunctional dicarboxylic acid;

(b) from about 4 to about 25 mole percent, based on a total of all acid, hydroxyl and amino equivalents being equal to 200 mole percent, or at least one difunctional sulfomonomer containing at least one cationic sulfonate group attached to an aromatic or cycloaliphatic nucleus wherein the functional groups are hydroxy, carboxyl or amino;

(c) at least one difunctional reactant selected from a glycol or a mixture of a glycol and diamine having two —NRH groups, the glycol containing two —CH₂—OH groups of which (1) at least 10 mole percent, based on the total mole percent of hydroxy or hydroxy and amino equivalents, is a poly(ethylene glycol) having the structural formula:

H—(OCH₂—CH₂)ₙ—OH, n being an integer of from 2 to about 20, or (2) of which from about 0.1 to less than about 15 mole percent, based on the total mole percent of hydroxy or hydroxy and amino equivalents, is a poly(ethylene glycol) having the structural formula:

H—(OCH₂—CH₂)ₙ—OH, n being an integer of between 2 and about 500, and with the proviso that the mole percent of said poly(ethylene glycol) within said range is inversely proportional to the quantity of n with said range;

(d) from none to at least one difunctional reactant selected from a hydroxycarboxylic acid having one —C(R)₂—OH group, an amino—carboxylic acid having one —NRH group, and an amino-alcohol having one —C(R)₂—OH group and one —NRH group, or mixtures of said difunctional reactants; wherein each R in the (c) or (d) reactants is a H atom or an alkyl group of 1 to 4 carbon atoms; and (e) from about 0.1 mole % to about 15 mole %, based on a total of all acid, hydroxyl and amino equivalents being equal to 200 mole % of colorant having at least one acid, hydroxy or amino group reacted onto or into the polymer chain.

3. The composition of claim 2 wherein the polymeric material contains less than about 10 mol %, based on all reactants, of reactant (d), at least about 70 mol % of reactant (c) is glycol, and at least about 70 mol % of all hydroxy equivalents is present in the glycol.

4. The composition of claim 3 wherein the colorant is selected from: anthraquinones; methines; bis-methines; 3H-dibenz[f,ij]isoquinoline 2,7-diones (anthrapyridones); triphenodioxzines; fluoridines; phthaloylpyrrocolines; coumarins; 4-amino-1,8-naphthalimides; thioxanthones; 2,5-arylaminoterephthalic acids (or esters); benzanthrones; and indanthrones; said colorants containing at least one condensable group.

5. The composition of claim 3 wherein the colorant is selected from 3H-dibenz[f,ij]isoquinoline-2,7-diones (anthrapyridones); benzo[f]pyrido[1,2-a]indole-6,11-diones; thioxanthene-9-ones; coumarins; 2H-1,4-benzoxazine-2-ones; triphenodioxazines; 5,12-dihydroquinoxalino[2,3-b]phenazine (fluorindines); 3,6-diaminopyromellitic acid diimides; 2,5(3)diarylaminoterephthalic acids (esters); 4-amino-1,8-naphthalimides; naphtho[1',2',3':4,5]quino[2,1-b]quinazoline-5,10-diones; 7H benzo[de]anthracen-7-ones (benzanthrones); 7H-benzo[e]perimidin-7-ones; 6,15-dihydro-5,9,14,18-anthrazinetetrones (indanthrones); quinophthalones; 7H-benzimidazo[2,1-a][de]isoquinolin-7-ones; 5H-benzo[a]phenoxazine-5-ones; 6H,13H-pyrido[1,2-a: 3,4-b]diindole-6,13-diones; and diindolo[3,2,1-de-3',2',1'-ij][1,5]naphthyridine-6,13-dione.

6. The composition of claim 3 wherein the colorant is selected from those of the formula:

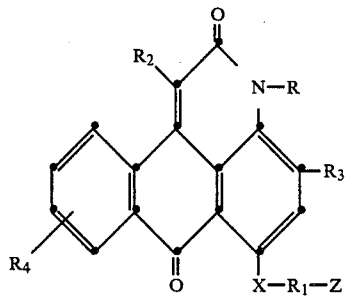

wherein:

R is hydrogen, cycloalkyl or alkyl; X is —O—, —S—, or —NH—; —X—R₁—Z in combination is hydrogen or halogen; R₁ is selected from -alkylene-Z', -arylene-Z', -cycloalkylene-Z', -aralkylene-Z', -cycloalkylenealkylene-Z', -alkarylene-Z', -alkylenecycloalkylenealkylene-Z', -alkylenearalkylene-Z', or alkylenecycloalkylene-Z', wherein -Z and Z' are independently selected from hydrogen, —SO₂R⁵, —SO₂NR⁵R⁵, —NHSO₂R⁵, —N(R⁵)SO₂R⁵, —N(R⁵)COR⁵, —NHCOR⁵, —OH, —SR⁵, —OR⁵, —NHR⁵, —NR⁵R⁵, —SO₂NHR⁵, —CONHR⁵, —CONR⁵R⁵, —CO₂R⁵, —OCOR⁵, —OCO₂R⁵, —OOCNHR⁵,

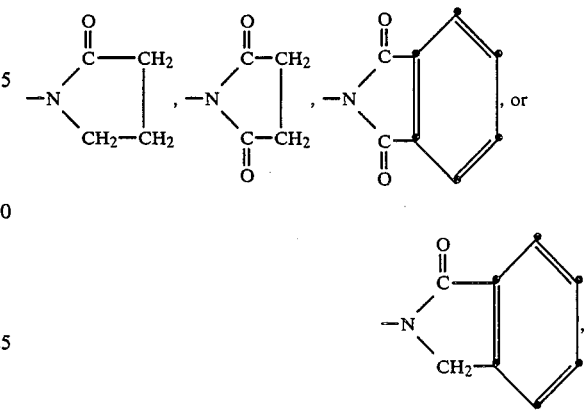

wherein R⁵ is hydrogen, alkyl, allyl, aryl, cycloalkyl, hydroxyalkyl, alkoxyalkoxyalkyl, alkoxyalkyl, hydroxyalkoxy, hydroxyalkoxyalkyl, alkoxycarbonylalkyl or carboxyaryl, and when X is —O—, or —NH—, —R₁—Z in combination also can be hydrogen; R₂ is hydrogen, alkyl, aryl, cyano, alkoxycarbonyl, aryloxycarbonyl, aralkoxycarbonyl, cycloalkylalkoxycarbonyl, COCl, carboxy, carbamyl, N-alkylcarbamyl, N,N-dialkylcarbamyl, N-alkyl-N-arylcarbamyl, N-arylcarbamyl, N-cycloalkylcarbamyl, acyl, aroyl, amino, alkylamino, dialkylamino, arylamino, cycloalkylamino, alkoxy, hydroxy, alkylthio or arylthio; and each of R₃ and R₄ is hydrogen, alkyl, halogen or alkoxy; wherein each of the above alkyl, alkylene, aryl, arylene, cycloalkyl or cycloalkylene moieties or portions of a group or radical may be substituted with 1-3 substituents selected from hydroxyl, carboxyl, carboxy ester, acyloxy, alkyl, cyano, alkoxycarbonyl, alkoxycarbonyloxy, halogen, alkoxy, hydroxyalkoxy, hydroxyalkyl, aryl, aryloxy, or cycloalkyl.

7. The composition of claim 6 wherein X is —NH— and —R₁—Z in combination is selected from: aryl; aryl substituted with 1-3 of alkyl, alkoxy, halogen, hydroxyalkyl, hydroxyalkoxy or acylamido; alkyl; alkyl substituted with 1-3 of hydroxyl or acyloxy; cycloalkyl; or cycloalkyl substituted with 1-3 of alkyl; —X—R₁—Z in combination is H; R is alkyl; R₂ is alkoxycarbonyl, hydroxyalkylamino, or cyano; and R₃ and R₄ are each hydrogen.

8. The composition of claim 3 wherein the colorant is selected from those of the formulae

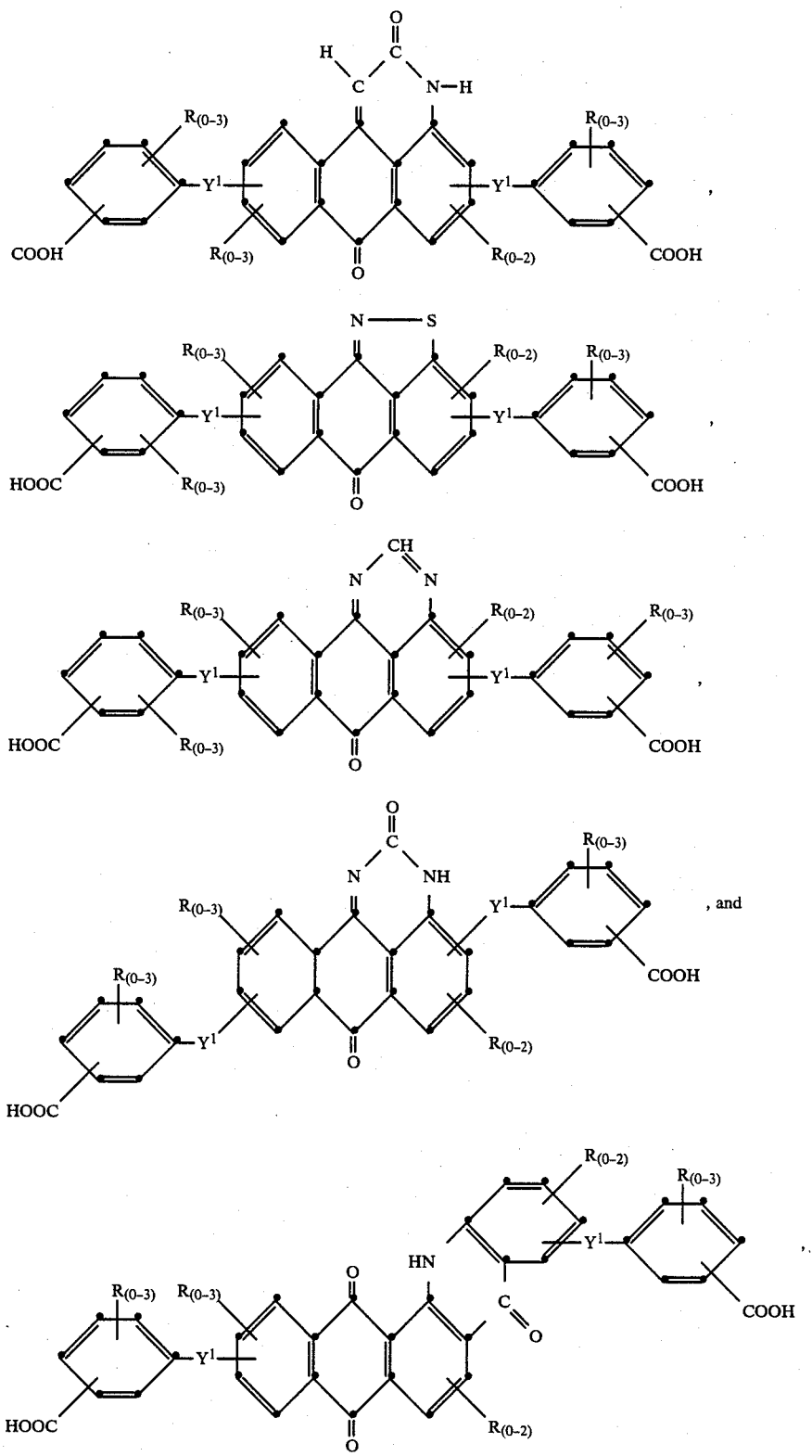

wherein $Y^1$ is —NH or —S—, and each R, when present, is selected from Cl, Br, alkyl of 1–10 carbons, aryl, aroyl, cycloalkyl, CN, alkoxy of 1–6 carbons, hydroxyalkyl of 1–6 carbons, alkanoyl of 1–6 carbons, alkoxycarbonyl of 1–6 carbons, alkanoyloxy of 1–6 carbons, alkylamino of 1–6 carbons, alkanoylamino of 1–6 carbons, or mono- or dialkylcarbamyl of 1–6 carbons.

9. The composition of claim 3 wherein the water-dispersible polymeric material comprises (a) an acid component of from about 75 to about 84 mole % isophthalic acid and conversely from about 25 to about 16 mole %

5-sodio-sulfoisophthalic acid, (c) a glycol component of from about 45 to about 60 mole % diethylene glycol and conversely from about 55 to about 40 mole % 1,4-cyclohexanedimethanol or ethylene glycol or mixtures thereof, and (e) from about 0.5 to about 10 mole % of mono- or difunctional colorant.

10. The composition of claim 3 wherein the inherent viscosity of the water-dispersible polymeric material is from about 0.28 to about 0.38, the said acid component comprises from about 80 to about 83 mole % isophthalic acid and conversely from about 20 to about 17 mole % 5-sodiosulfoisophthalic acid, and the said glycol component comprises from about 52 to about 56 mole % diethylene glycol and conversely from about 48 to about 44 mole % 1,4-cyclohexanedimethanol.

11. The composition of claim 8 wherein the polymeric material has an inherent viscosity of from about 0.20 to about 0.38.

12. The composition of matter of claim 1, wherein the colorant comprises one or more compounds of the formula

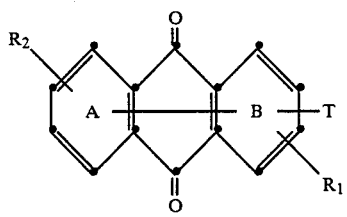

wherein:
$R_1$ and $R_2$ each represents hydrogen or 1-3 substituents, depending on the number of T substituents present, and are independently selected from alkyl, alkoxy, alkylamino, alkylsulfonyl, alkylsulfonylamino, alkanoylamino, aroylamino, alkylthio, arylamino, amino, cycloalkylamino, alkanoyl, aroyl, arylsulfonyl, $CF_3$, arylsulfamoyl, cyano, halogen, hydroxy, nitro, sulfamoyl, alkylsulfamoyl, dialkylsulfamoyl, carbamoyl, alkylcarbamoyl and dialkylcarbamoyl; and T is 1-4 independently selected substituents of the formula

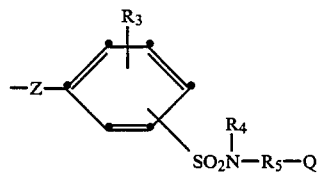

in any positions on rings A and/or B, wherein:
each Z is a divalent linking group independently selected from —NH—, —S—, —O—, —NHR—, —SR—, —SRS—, —SRO—, —SRSR—, —NHRO—, —NHRORO—, —NHRS—, —NHRSR—, —NHRN(COR)—, —NHRN(SO$_2$R)—, —ORO—, —OR—, —OROR—, —ORORO—, —ORSR—, and —ORN(COR)RO—, wherein R is aralkylene, alkylene, arylene or cycloalkylene;
$R_3$ represents hydrogen or 1-3 substituents independently selected from alkyl, alkoxy, cyano, alkanoylamino, halogen, and alkylthio;
each $R_4$ is independently selected from hydrogen, alkyl, cycloalkyl, and aryl;
each $R_5$ is independently selected from alkylene, arylene, cycloalkylene, arylenealkylene, aryleneoxyalkylene, arylenethioalkylene, alkylenethioalkylene, alkyleneoxyalkylene, arylenedialkylene, and cyclohexylenedialkylene;
each Q represents 1-3 groups independently selected from acyloxy; —OCOO-alkyl, hydroxy, carboxy, —COO-alkyl, —COO-aryl, and —COO-cycloalkyl;
and wherein the alkyl, alkylene, cycloalkyl, cycloalkylene, aryl and arylene moieties or portions of the above $R_1$-$R_5$ groups are unsubstituted or substituted with 1-3 of the following; hydroxy, halogen; cyano; amino; alkoxy; alkoxycarbonyl; aroyloxy; alkoxyalkoxy; hydroxyalkoxy; succinimido; glutarimido; phthalimido; phthalimidino; 2-pyrolidono; cyclohexyl; phenoxy; phenyl; phenyl substituted with alkyl, alkoxy, alkoxycarbonyl, halogen, alkanoylamino or cyano; acrylamido; alkenyl; benzoylsulfonicimido; groups of the formula

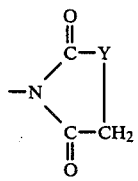

wherein Y is —NH—,

—O—, —S—, >CHOH, or —CH$_2$—O—; —S—$R^6$ wherein $R^6$ is selected from alkyl, alkyl substituted with 1-3 of halogen, hydroxy, phenoxy, aryl, cyano, cycloalkyl, alkylsulfonyl, alkylthio, alkanoyloxy, or alkoxy, phenyl, phenyl substituted with one or more of halogen, alkyl, alkoxy, alkanoylamino, cyano or alkoxycarbonyl, pyridyl, pyrimidinyl, 2-benzoxazolyl, 2-benzimidazolyl, 2-benzothiazolyl or groups of the formula

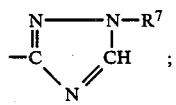

—SO$_2$$R^8$; —COO$R^8$; —OX$R^8$; —NH—X—$R^8$; —CONR$^7$$R^7$; —SO$_2$NR$^7$$R^7$; wherein X is —CO—, COO—, or —SO$_2$; $R^8$ is selected from alkyl, aryl, cycloalkyl, and each of these groups substituted with 1-3 substituents independently selected from halogen, hydroxy, phenoxy, aryl, alkyl, cyano, cycloalkyl, alkylsulfonyl, alkylthio, alkanoyloxy, or alkoxy, and when X is —CO—, $R^8$ is further selected from hydrogen, amino, alkenyl, alkylamino, dialkylamino, arylamino or furyl; $R^7$ is selected from hydrogen, alkyl, aryl, alkoxysubstituted aryl, cycloalkyl, amino, alkylamino, dialkylamino, arylamino, furyl, or alkyl substituted with 1-3 of halogen, hydroxy, phenoxy, aryl, cyano, cycloalkyl, alkylsulfonyl, alkylthio, alkanoyloxy, or alkoxy; alkoxy substituted with 1-3 of hydroxy, cyano or alkanoyloxy; alkoxyalkoxy substituted with 1-3 of hydroxy, cyano, alkanoyloxy or alkoxy; or phenoxy substituted with 1-3 of alkyl, alkoxy or halogen.

13. The composition of matter of claim 1, wherein the colorant comprises one or more compounds of the formula

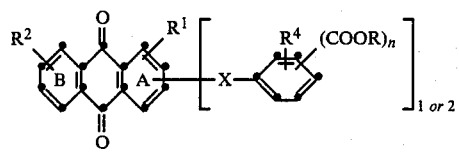

wherein either or both of rings A and B may contain in any position thereon one or two groups of the formula

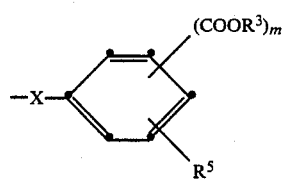

wherein:
R and $R^3$ each is selected from hydrogen, lower alkyl or hydroxy substituted lower alky; $R^1$, $R^2$, $R^4$ and $R^5$ each represents hydrogen or 1-3 substituents selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkylsulfonyl, lower alkylthio, lower alkanoylamino, or cyclohexylamino; wherein each aforesaid aryl moiety is 6-10 carbons; X is —S— or —NH—; n is 1 or 2; and m is 0, 1, or 2.

14. The composition of claim 1, wherein the colorant comprises one or more compounds of the formula

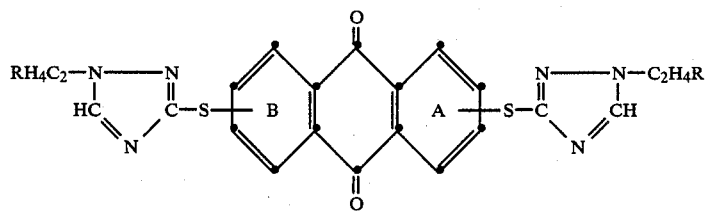

wherein:
R is —OH, —COOR$^1$ or —COX wherein $R^1$ is —H or lower alkyl and X is halogen; either or both of A and B may contain at least one additional group of the formula

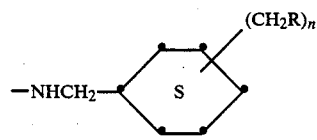

wherein n is 1 or 2; and wherein each of rings A and B may be further substituted with 1-3 radicals selected from the following: lower alkyl which may be substituted with lower alkoxy, aryl, Cl, Br, or lower alkanoylamino; lower alkoxy which may be substituted with lower alkoxy, phenyl, Cl, Br, or lower alkanoylamino; chlorine; bromine; amino; lower alkyl amino which may be substituted with lower alkoxy, cyclohexyl, phenyl, Cl, Br, or lower alkanoylamino; arylamino, arylthio, or aroylamino, wherein each aryl is 6-10 carbons; lower alkylsulfonyl; lower alkylthio; lower alkanoylamino; or cyclohexylamino.

15. The composition of claim 1, wherein the colorant comprises one or more compounds of the formulae

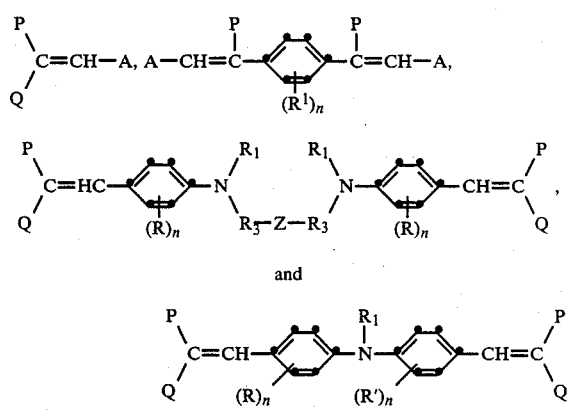

and

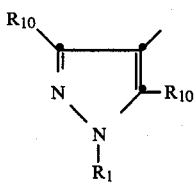

wherein each A is selected from the following radicals:

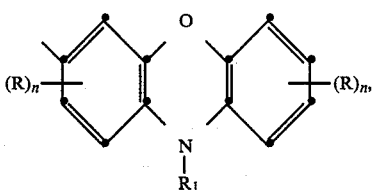

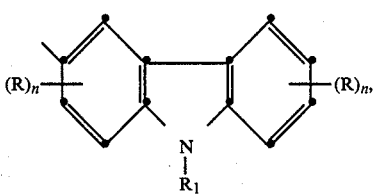

-continued

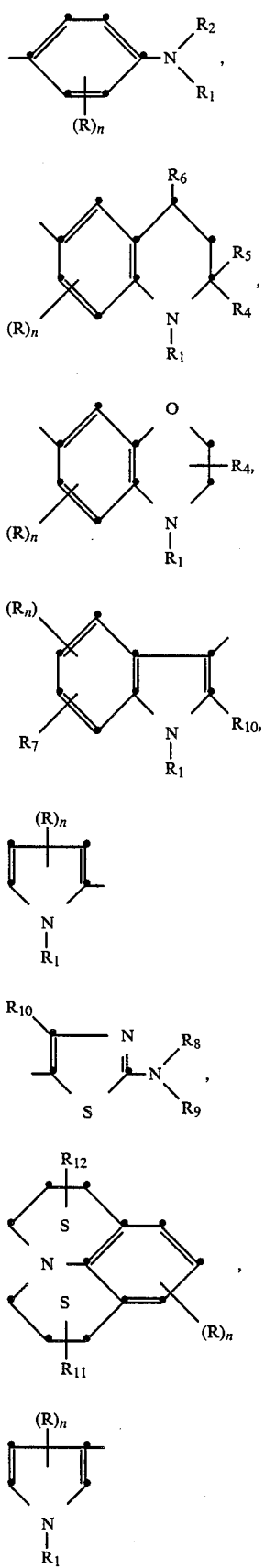

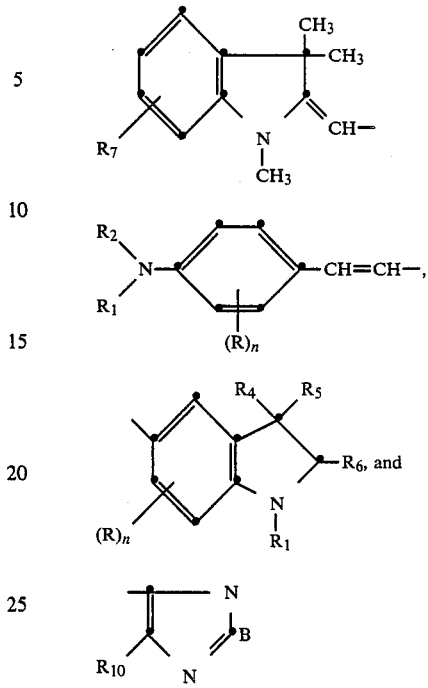

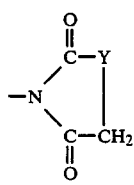

wherein:
R and R' are selected from hydrogen, fluorine, chlorine, bromine, alkyl, alkoxy, phenyl, phenoxy, alkylthio, or arylthio; n is 0, 1 or 2;

$R_1$ and $R_2$ are each selected from hydrogen; cycloalkyl; cycloalkyl substituted with one or two of alkyl; —OH, alkoxy, halogen, or hydroxy substituted alkyl; phenyl; phenyl substituted with alkyl, alkoxy, halogen, alkanoylamino, carboxy, cyano, or alkoxycarbonyl; straight or branched lower alkenyl; straight or branched alkyl of 1–8 carbons and such alkyl substituted with the following: hydroxy; halogen; cyano; succinimido; hydroxysuccinimido; acyloxysuccinimido; glutarimido; phenylcarbamoyloxy; phthalimido; 4-carboxyphthalimido; phthalimidino; 2-pyrrolidino; cyclohexyl; phenyl; phenyl substituted with alkyl, alkoxy, halogen, hydroxy alkanoylamino, carboxy, cyano, or alkoxycarbonyl; alkylsulfamoyl, vinylsulfonyl; acrylamido; sulfamyl; benzoyl-sulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula $$-N\begin{matrix}C-Y\\||\\O\end{matrix}\begin{matrix}\\\\\\C-CH_2\\||\\O\end{matrix}$$

wherein Y is —NH—, $-\overset{|}{N}-$alkyl,

—O—, —S—, or —CH₂O—; —S—R₁₄; SO₂CH₂CH₂SR₁₄; wherein R₁₄ is alkyl, phenyl, phenyl substituted with halogen, alkyl, alkoxy, alkanoylamino, cyano, or alkoxycarbonyl; pyridyl; pyrimidinyl; benzoxazolyl; benzimidazolyl; benzothiazolyl; radicals of the formula

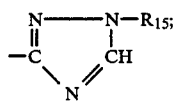

—OXR₁₆; —NHXR₁₆; —X—R₁₆; —CONR₁₅R₁₅; and —SO₂NR₁₅R₁₅; wherein R₁₅ is selected from H, aryl, alkyl, and alkyl substituted with halogen; —OH, phenoxy, aryl, —CN, cycloalkyl, alkylsulfonyl, alkylthio, alkanoyloxy, or alkoxy; X is —CO—, —COO—, or —SO₂—; R₁₆ is selected from alkyl and alkyl substituted with halogen, hydroxy, phenoxy, aryl, cyano, cycloalkyl, alkylsulfonyl, alkylthio, alkanoyloxy, and alkoxy; and when X is —CO—, R₁₆ also can be hydrogen, amino, alkenyl, alkylamino, dialkylamino, arylamino, aryl, or furyl; alkoxy; alkoxy substituted with hydroxy, cyano, alkanoyloxy, or alkoxy; phenoxy; phenoxy substituted with one or more of alkyl, carboxy, alkoxy, carbalkoxy, or halogen; R₁ and R₂ can be a single combined group such as pentamethylene, tetramethylene, ethyleneoxyethylene, ethylene sulfonylethylene, or

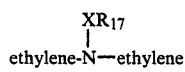

which, with the nitrogen to which it is attached, forms a ring; R₁₇ is alkyl, aryl, or cycloalkyl;

R₃ is alkylene, arylene, aralkylene, alkyleneoxy, or alkyleneoxyalkylene;

Z is a direct single bond, OCO, O, S, SO₂, R₁₇SO₂N=,

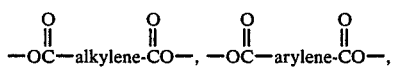

arylene, or alkylene;

R₄, R₅, and R₆ are each selected from hydrogen or alkyl;

R₇ is carboxy, carbalkoxy, or (R)ₙ;

R₁₀ is hydrogen, alkyl, and aryl;

R₈ and R₉ are each selected from hydrogen and substituted or unsubstituted alkyl, aryl, or cycloalkyl R₁₁ and R₁₂ are each selected from hydrogen, alkyl, hydroxyl, or acyloxy;

B represents the atoms necessary to complete a five- or six-membered ring and is selected from

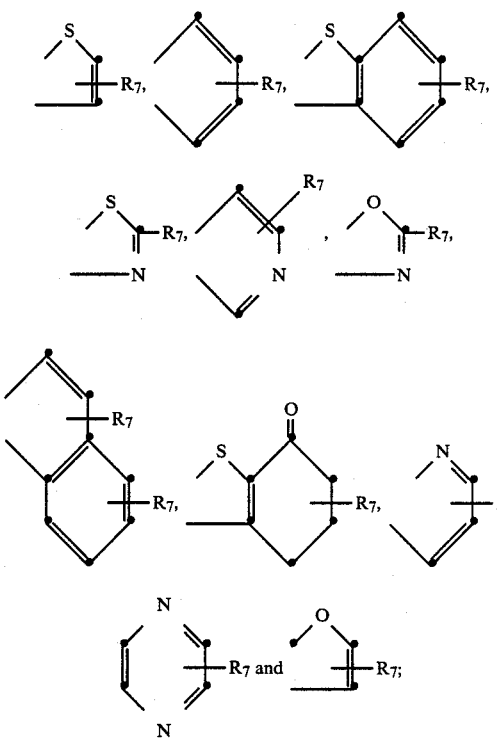

each P and Q is selected from cyano, carbalkenyloxy, carbcycloalkyloxy, carbalkoxy, carbaryloxy, carbaralkyloxy, carbamyl, carboxy, N-alkylcarbamyl, N-alkyl-N-arylcarbamyl, N,N-dialkylcarbamyl, N-arylcarbamyl, N-cyclohexylcarbamyl, aryl, 2-benzoxazolyl, 2-benzothiazolyl, 2-benzimidazolyl, naphthyl, pyridyl, pyrimidinyl, 1,3,4-thiadiazol-2-yl, 1,3,4-oxadiazol-2-yl, SO₂ alkyl, SO₂ aryl, and acyl, or P and Q may be combined as

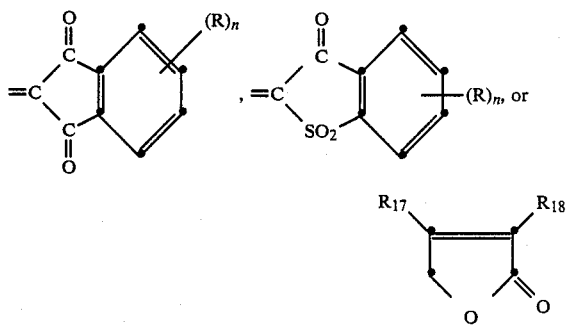

wherein R₁₇ is defined above and R₁₈ is CN, COOH, CO₂ alkyl, carbamyl, or N-alkylcarbamyl;

wherein at least one of A, P, and Q for each dye molecule must be or bear a condensable group selected from carboxy, carbalkoxy, carbaryloxy, N-alkylcarbamyloxy, acyloxy, chlorocarbonyl, carbamyloxy, N-(alkyl)₂carbamyloxy, amino, alkylamino, hydroxyl, N-phenylcarbamyloxy, cyclohexanoyloxy, and carbocyclohexyloxy;

wherein when an (R) substituent is present, n is an integer up to the available substitution sites on the ring; and wherein in the above definitions, each alkyl, aryl, or cycloalkyl moiety or portion of a group or radical may be substituted with hydroxyl, acyloxy, alkyl, cyano, alkoxycarbonyl, halogen, alkoxy, or aryl, aryloxy, or cycloalkyl.

* * * * *

UNITED STATES PATENT AND TRADEMARK OFFICE
CERTIFICATE OF CORRECTION

PATENT NO. : 4,804,719
DATED : February 14, 1989
INVENTOR(S) : Max A. Weaver and L. Jane Adams It is certified that error appears in the above-identified patent and that said Letters Patent is hereby corrected as shown below:

Column 50, line 37, in Claim 2, "or" should be ---of---.

Column 57, line 28, in Claim 13, "alky;" should be ---alkyl;---.

Column 57, line 41, in Claim 14, after "composition", insert ---of matter---.

Column 60, lines 24-28, delete the formula and insert therefor

Signed and Sealed this

Tenth Day of October, 1989

Attest:

DONALD J. QUIGG

Attesting Officer

Commissioner of Patents and Trademarks